United States Patent
Zhu et al.

(10) Patent No.: US 12,464,386 B2
(45) Date of Patent: Nov. 4, 2025

(54) TECHNIQUES FOR BEAM SELECTION BASED ON MEASUREMENT PERIODICITIES

(71) Applicant: QUALCOMM Incorporated, San Diego, CA (US)

(72) Inventors: Jun Zhu, San Diego, CA (US); Chinmay Shankar Vaze, San Diego, CA (US); Mihir Vijay Laghate, San Diego, CA (US); Raghu Narayan Challa, San Diego, CA (US); Alexei Yurievitch Gorokhov, San Diego, CA (US); Brian Clarke Banister, San Diego, CA (US); Yongle Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 651 days.

(21) Appl. No.: 17/872,302

(22) Filed: Jul. 25, 2022

(65) Prior Publication Data
US 2023/0033247 A1  Feb. 2, 2023

Related U.S. Application Data

(60) Provisional application No. 63/226,537, filed on Jul. 28, 2021.

(51) Int. Cl.
*H04W 24/08* (2009.01)
*H04L 5/00* (2006.01)

(52) U.S. Cl.
CPC .......... *H04W 24/08* (2013.01); *H04L 5/0048* (2013.01)

(58) Field of Classification Search
CPC ... H04L 5/0048; H04L 5/0023; H04B 7/0626; H04B 7/0695; H04W 72/042; H04W 24/10
See application file for complete search history.

(56) References Cited

U.S. PATENT DOCUMENTS

2019/0141552 A1* 5/2019 Chen .................. H04B 7/0617
2019/0230544 A1 7/2019 Zhu et al.
(Continued)

OTHER PUBLICATIONS

"3rd Generation Partnership Project, Technical Specification Group Radio Access Network, Study on New Radio (NR) Access Technology (Release 16)", 3GPP Standard, Technical Specification, 3GPP TR 38.912, 3rd Generation Partnership Project, Mobile Competence Centre, 650, Route Des Lucioles, F-06921 Sophia-Antipolis Cedex, France, vol. TSG RAN, No. V16.0.0, Jul. 18, 2020, XP051925505, pp. 1-74, Section 8.2.1.6.1.
(Continued)

*Primary Examiner* — Iqbal Zaidi
(74) *Attorney, Agent, or Firm* — Dalei Dong; Holland & Hart LLP

(57) ABSTRACT

Methods, systems, and devices for wireless communications are described in which a user equipment (UE) may perform beam measurements for one or more subsets of beams that are selected to provide enhanced beam switch determinations. The UE may identify one or more prioritized beams, and may measure the prioritized beams at a same periodicity as measurements of a serving beam. The UE may, additionally or alternatively, identify a set of all layer one beams (e.g., maximum-level beams or top level beams) for measurement according to a periodic interval, based on a measured mobility being less than a threshold value. The periodic interval may provide that each layer one beam may be measured at a cadence of one beam per measurement occasion, in order to provide measurement diversity.

26 Claims, 11 Drawing Sheets

(56) References Cited

U.S. PATENT DOCUMENTS

2020/0280417 A1\* 9/2020 Lindoff ................ H04B 7/0695
2021/0204346 A1   7/2021 Ye et al.
2021/0306868 A1\* 9/2021 Johansson ........... H04W 72/046

OTHER PUBLICATIONS

Partial International Search Report—PCT/US2022/038298—ISA/EPO—Oct. 17, 2022 (2106280WO).
International Search Report and Written Opinion—PCT/US2022/038298—ISA/EPO—Dec. 8, 2022 (2106280WO).

\* cited by examiner

TECHNIQUES FOR BEAM SELECTION BASED ON MEASUREMENT PERIODICITIES

CROSS REFERENCE

The present Application for Patent claims the benefit of U.S. Provisional Patent Application No. 63/226,537 by ZHU et al., entitled "TECHNIQUES FOR BEAM SELECTION BASED ON MEASUREMENT PERIODICITIES," filed Jul. 28, 2021, assigned to the assignee hereof, and expressly incorporated by reference herein.

FIELD OF TECHNOLOGY

The following relates to wireless communications, including techniques for beam selection based on measurement periodicities.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support beamformed communications in which directional beams may be used between a UE and a base station. In some cases, wireless systems may experience interference or blockages in relation to beams and beam measurements for various reasons, which may result in poor system performance and poor user experience.

SUMMARY

The described techniques relate to improved methods, systems, devices, and apparatuses that support techniques for beam selection based on measurement periodicities. Various aspects of the present disclosure provide for efficient beam selection and measurement in relatively high or low mobility scenarios. In some high mobility cases, a number of the prioritized beams may be scheduled for measurement at a same periodicity as measurements of a serving beam. In some cases, up to a maximum number (N) beams having a measured signal strength within a range of the serving beam signal strength (e.g., within X dB) may be scheduled for measurement at the same periodicity as the serving beam. A beam switch may be triggered based on channel quality of a measured beam exceeding the serving beam (e.g., better than the serving beam by a predetermined margin). In some low mobility cases, a set of layer one beams (or maximum-level beams) may be measured according to a periodic interval based on a measured mobility being less than a threshold mobility value. In some cases, each layer one beam may be measured at a cadence of one beam per measurement occasion, which provides a lower sampling rate than for prioritized beams based on a codebook hierarchy, but allows for identification of a beam obstruction event at the prioritized beams.

A method for wireless communication at a user equipment (UE) is described. The method may include measuring first channel characteristics of a serving beam according to a first periodicity associated with transmission of one or more reference signals using the serving beam, selecting one or more candidate beams from a set of available beams for measurement according to the first periodicity, the one or more candidate beams selected based on a signal strength of beams of the set of available beams, measuring second channel characteristics of each of the one or more candidate beams according to the first periodicity, and triggering a beam switch to a first candidate beam of the one or more candidate beams based on the first channel characteristics of the serving beam being below a threshold value.

An apparatus for wireless communication at a UE is described. The apparatus may include a processor, memory coupled with the processor, and instructions stored in the memory. The instructions may be executable by the processor to cause the apparatus to measure first channel characteristics of a serving beam according to a first periodicity associated with transmission of one or more reference signals using the serving beam, select one or more candidate beams from a set of available beams for measurement according to the first periodicity, the one or more candidate beams selected based on a signal strength of beams of the set of available beams, measure second channel characteristics of each of the one or more candidate beams according to the first periodicity, and trigger a beam switch to a first candidate beam of the one or more candidate beams based on the first channel characteristics of the serving beam being below a threshold value.

Another apparatus for wireless communication at a UE is described. The apparatus may include means for measuring first channel characteristics of a serving beam according to a first periodicity associated with transmission of one or more reference signals using the serving beam, means for selecting one or more candidate beams from a set of available beams for measurement according to the first periodicity, the one or more candidate beams selected based on a signal strength of beams of the set of available beams, means for measuring second channel characteristics of each of the one or more candidate beams according to the first periodicity, and means for triggering a beam switch to a first candidate beam of the one or more candidate beams based on the first channel characteristics of the serving beam being below a threshold value.

A non-transitory computer-readable medium storing code for wireless communication at a UE is described. The code may include instructions executable by a processor to measure first channel characteristics of a serving beam according to a first periodicity associated with transmission of one or more reference signals using the serving beam, select one or more candidate beams from a set of available beams for measurement according to the first periodicity, the one or more candidate beams selected based on a signal strength of beams of the set of available beams, measure second channel characteristics of each of the one or more candidate beams according to the first periodicity, and trigger a beam switch to a first candidate beam of the one or more candidate beams based on the first channel characteristics of the serving beam being below a threshold value.

In some examples of the method, apparatuses, and non-transitory computer-readable medium described herein, the measurement of the one or more candidate beams at the first periodicity provides consistent sampling and filtering of the one or more candidate beams and the serving beam for equivalent comparison of associated channel characteristics. In some examples of the method, apparatuses, and non-transitory computer-readable medium described herein, the measuring the channel characteristics for the serving beam and for each of the one or more candidate beams may include operations, features, means, or instructions for measuring the channel characteristics of each beam on a per-synchronization signal block (SSB) basis. In some examples of the method, apparatuses, and non-transitory computer-readable medium described herein, the one or more candidate beams include up to a determined quantity of beams of the set of available beams that are within a measurement difference threshold of the serving beam.

Some examples of the method, apparatuses, and non-transitory computer-readable medium described herein may further include operations, features, means, or instructions for updating the selected one or more candidate beams after each measurement period of the first periodicity. In some examples of the method, apparatuses, and non-transitory computer-readable medium described herein, each measurement period includes a set of measurement occasions and one or more beams other than the one or more candidate beams are measured in a measurement period when fewer candidate beams than measurement occasions are present.

In some examples of the method, apparatuses, and non-transitory computer-readable medium described herein, one or more beams of the set of available beams other than the one or more candidate beams are selected for inclusion in a prioritized subset of beams based on one or more previous measurement metrics, a codebook hierarchy, or any combinations thereof. In some examples of the method, apparatuses, and non-transitory computer-readable medium described herein, the one or more previous measurement metrics identify the prioritized subset of beams as beams having one or more of a reference signal received power (RSRP) or signal to noise ratio (SNR) that exceed corresponding measurement metrics of other beams by a determined amount, and where the codebook hierarchy indicates one or more beams that are associated with the serving beam. In some examples of the method, apparatuses, and non-transitory computer-readable medium described herein, the selecting of the one or more candidate beams are based on a detected mobility of the UE exceeding a threshold value.

A method for wireless communication at a UE is described. The method may include selecting a first subset of beams from a set of available beams based on codebook hierarchy associated with a first beam that has one or more channel metrics that exceed corresponding channel metrics of other beams of the set of available beams, where the first subset of beams are prioritized for channel measurements, determining that a mobility of the UE is less than a threshold value, selecting, based on the determining, a second subset of beams from the set of available beams, the second subset of beams including highest level parent beams of the set of available beams, measuring channel characteristics for each beam of the first subset of beams at a first measurement interval, and measuring channel characteristics for each beam of the second subset of beams at a second measurement interval that has a longer periodicity than the first measurement interval, and triggering a beam switch to a first candidate beam of the second subset of beams based on the first candidate beam having measured channel characteristics that exceed corresponding channel characteristics of each beam of the first subset of beams.

An apparatus for wireless communication at a UE is described. The apparatus may include a processor, memory coupled with the processor, and instructions stored in the memory. The instructions may be executable by the processor to cause the apparatus to select a first subset of beams from a set of available beams based on codebook hierarchy associated with a first beam that has one or more channel metrics that exceed corresponding channel metrics of other beams of the set of available beams, where the first subset of beams are prioritized for channel measurements, determine that a mobility of the UE is less than a threshold value, select, based on the determining, a second subset of beams from the set of available beams, the second subset of beams including highest level parent beams of the set of available beams, measure channel characteristics for each beam of the first subset of beams at a first measurement interval, and measuring channel characteristics for each beam of the second subset of beams at a second measurement interval that has a longer periodicity than the first measurement interval, and trigger a beam switch to a first candidate beam of the second subset of beams based on the first candidate beam having measured channel characteristics that exceed corresponding channel characteristics of each beam of the first subset of beams.

Another apparatus for wireless communication at a UE is described. The apparatus may include means for selecting a first subset of beams from a set of available beams based on codebook hierarchy associated with a first beam that has one or more channel metrics that exceed corresponding channel metrics of other beams of the set of available beams, where the first subset of beams are prioritized for channel measurements, means for determining that a mobility of the UE is less than a threshold value, means for selecting, based on the determining, a second subset of beams from the set of available beams, the second subset of beams including highest level parent beams of the set of available beams, means for measuring channel characteristics for each beam of the first subset of beams at a first measurement interval, and measuring channel characteristics for each beam of the second subset of beams at a second measurement interval that has a longer periodicity than the first measurement interval, and means for triggering a beam switch to a first candidate beam of the second subset of beams based on the first candidate beam having measured channel characteristics that exceed corresponding channel characteristics of each beam of the first subset of beams.

A non-transitory computer-readable medium storing code for wireless communication at a UE is described. The code may include instructions executable by a processor to select a first subset of beams from a set of available beams based on codebook hierarchy associated with a first beam that has one or more channel metrics that exceed corresponding channel metrics of other beams of the set of available beams, where the first subset of beams are prioritized for channel measurements, determine that a mobility of the UE is less than a threshold value, select, based on the determining, a second subset of beams from the set of available beams, the second subset of beams including highest level parent beams of the set of available beams, measure channel characteristics for each beam of the first subset of beams at a first measurement interval, and measuring channel characteristics for each beam of the second subset of beams at a second measurement interval that has a longer periodicity than the first measurement interval, and trigger a beam switch to a first candidate beam of the second subset of beams based on the first candidate beam having measured channel characteristics that exceed corresponding channel characteristics of each beam of the first subset of beams.

In some examples of the method, apparatuses, and non-transitory computer-readable medium described herein, the codebook hierarchy indicates one or more parent beams, child beams, neighbor beams, or any combinations thereof, associated with the first beam. In some examples of the method, apparatuses, and non-transitory computer-readable medium described herein, the first beam is selected based on being associated with a boresight of an antenna panel of the UE that has a line-of-sight (LoS) with an access network entity antenna, one or more measurement metrics, or any combinations thereof. In some examples of the method, apparatuses, and non-transitory computer-readable medium described herein, the codebook hierarchy may be a union of all adjacent beam relationships to the first beam in a codebook provided by an access network entity based on freespace beam characteristics.

In some examples of the method, apparatuses, and non-transitory computer-readable medium described herein, the second measurement interval corresponds to one beam of the second subset of beams per each first measurement interval. In some examples of the method, apparatuses, and non-transitory computer-readable medium described herein, each beam of the second subset of beams is measured once per a quantity of second measurement intervals that corresponds to a quantity of beams in the second subset of beams. In some examples of the method, apparatuses, and non-transitory computer-readable medium described herein, one or more beams of the first subset of beams are scheduled for measurement in measurement occasions that are unused for measurement of one or more beams of the second subset of beams. In some examples of the method, apparatuses, and non-transitory computer-readable medium described herein, the second measurement interval is selected to provide for one or more measurements of each beam of the first subset of beams at a higher periodicity than measurements of each beam of the second subset of beams.

In some examples of the method, apparatuses, and non-transitory computer-readable medium described herein, the mobility of the UE may be determined based on an inertial measurement unit (IMU) sensor measurement value, and where the threshold value is associated with a relatively slow or no UE movement as measured at the IMU. In some examples of the method, apparatuses, and non-transitory computer-readable medium described herein, the measuring channel characteristics for the second subset of beams provides for the beam switch to be performed in an event of a hand blockage associated with the first subset of beams.

A method for wireless communication at a UE is described. The method may include identifying a first subset of beams from a set of available beams for channel measurements based on a first serving beam used for communications with an access network entity, selecting, based on a mobility of the UE, a second subset of beams that includes one or more other beams outside of the first subset of beams for periodic channel measurements, where the second subset of beams includes a prioritized subset of beams based on previous measurement metrics or top-level beams included in a codebook of beams, measuring channel characteristics for the first subset of beams and the second subset of beams at a measurement interval, and triggering a beam switch to a first candidate beam of the first subset of beams or the second subset of beams based on the first candidate beam having higher measured channel characteristics than other measured channel characteristics of the first subset of beams and the second subset of beams.

An apparatus for wireless communication at a UE is described. The apparatus may include a processor, memory coupled with the processor, and instructions stored in the memory. The instructions may be executable by the processor to cause the apparatus to identify a first subset of beams from a set of available beams for channel measurements based on a first serving beam used for communications with an access network entity, select, based on a mobility of the UE, a second subset of beams that includes one or more other beams outside of the first subset of beams for periodic channel measurements, where the second subset of beams includes a prioritized subset of beams based on previous measurement metrics or top-level beams included in a codebook of beams, measure channel characteristics for the first subset of beams and the second subset of beams at a measurement interval, and trigger a beam switch to a first candidate beam of the first subset of beams or the second subset of beams based on the first candidate beam having higher measured channel characteristics than other measured channel characteristics of the first subset of beams and the second subset of beams.

Another apparatus for wireless communication at a UE is described. The apparatus may include means for identifying a first subset of beams from a set of available beams for channel measurements based on a first serving beam used for communications with an access network entity, means for selecting, based on a mobility of the UE, a second subset of beams that includes one or more other beams outside of the first subset of beams for periodic channel measurements, where the second subset of beams includes a prioritized subset of beams based on previous measurement metrics or top-level beams included in a codebook of beams, means for measuring channel characteristics for the first subset of beams and the second subset of beams at a measurement interval, and means for triggering a beam switch to a first candidate beam of the first subset of beams or the second subset of beams based on the first candidate beam having higher measured channel characteristics than other measured channel characteristics of the first subset of beams and the second subset of beams.

A non-transitory computer-readable medium storing code for wireless communication at a UE is described. The code may include instructions executable by a processor to identify a first subset of beams from a set of available beams for channel measurements based on a first serving beam used for communications with an access network entity, select, based on a mobility of the UE, a second subset of beams that includes one or more other beams outside of the first subset of beams for periodic channel measurements, where the second subset of beams includes a prioritized subset of beams based on previous measurement metrics or top-level beams included in a codebook of beams, measure channel characteristics for the first subset of beams and the second subset of beams at a measurement interval, and trigger a beam switch to a first candidate beam of the first subset of beams or the second subset of beams based on the first candidate beam having higher measured channel characteristics than other measured channel characteristics of the first subset of beams and the second subset of beams.

In some examples of the method, apparatuses, and non-transitory computer-readable medium described herein, the second subset of beams includes one or more beams that are selected for inclusion in the prioritized subset of beams based on one or more previous measurement metrics. In some examples of the method, apparatuses, and non-transitory computer-readable medium described herein, the one or more previous measurement metrics identify the prioritized subset of beams as beams having one or more of a RSRP or SNR that exceed corresponding measurement metrics of other beams by a determined amount.

In some examples of the method, apparatuses, and non-transitory computer-readable medium described herein, the first subset of beams includes one or more parent beams, child beams, neighbor beams, or any combinations thereof, associated with the first serving beam. In some examples of the method, apparatuses, and non-transitory computer-readable medium described herein, the first serving beam is selected based on being associated with a boresight of an antenna panel of the UE that has a LoS with an access network entity antenna, one or more measurement metrics, or any combinations thereof. In some examples of the method, apparatuses, and non-transitory computer-readable medium described herein, one or more beams of the first subset of beams are scheduled for measurement in measurement occasions that are unused for measurement of one or more beams of the second subset of beams.

DETAILED DESCRIPTION

Figure 1:
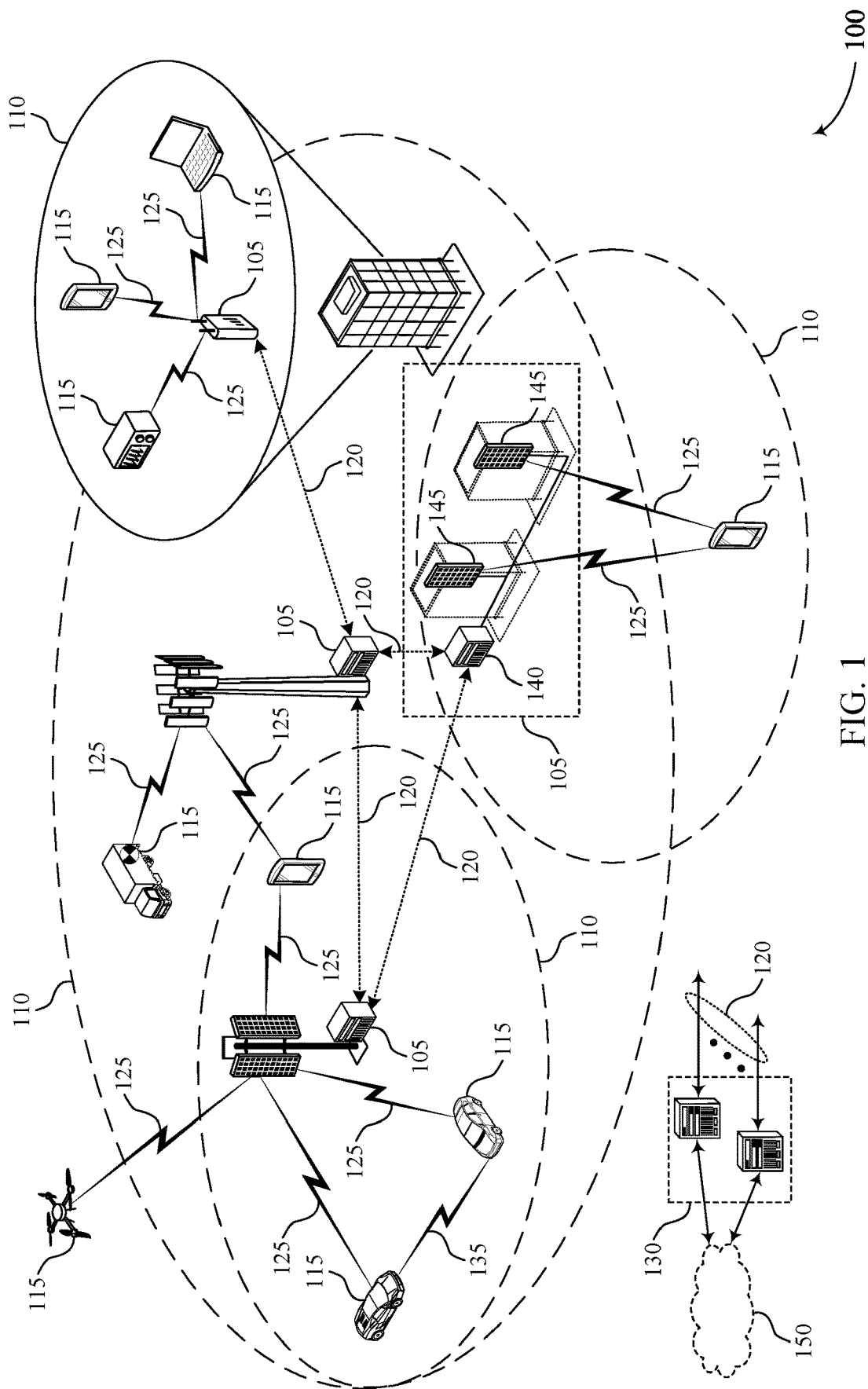
FIG. 1 illustrates an example of a wireless communications system that supports techniques for beam selection based on measurement periodicities in accordance with aspects of the present disclosure.

Some wireless communication systems, such as fifth generation (5G) New Radio (NR) systems, support beamformed communications in which devices share information via directional communication beams. When operating using beamformed communications, measurements of different beams may be used to determine one or more particular beams that are to be used between an access network entity (e.g., a base station) and user equipment (UE). Further, UEs may perform periodic beam measurements to support switching of beams when a serving beam quality becomes degraded. In some cases, UEs may perform periodic measurements of the serving beam and one or multiple other beams and, if an estimated channel quality of the serving beam crosses a threshold value (e.g., an absolute threshold value or a difference threshold relative to measurements of one or more other beams), a candidate beam may be selected based on the beam measurements for potential beam switching.

Beam measurements may be performed for multiple different beams that are used at a base station, and the base station may periodically transmit one or more reference signals using different beams to support such measurements. For example, synchronization signal blocks (SSBs) may be transmitted by a base station using different beams according to a defined pattern. However, if a UE were to measure each beam used by a base station, it would take a significant amount of time to perform such measurements, due to the number of SSBs that would have to be measured and the SSB periodicity (e.g., measurement of all SSBs may take approximately two seconds). During such a time duration, there is also a likelihood that measurements will become stale (e.g., due to UE movement, changes in blockages or interference levels, etc.), and thus lead to poor beam switching decisions. In order to mitigate such impacts, current techniques identify a subset of beams for measurement, based on beams that are related to a current serving beam. For example, the UE may identify a subset of beams based on a codebook hierarchy of beams that have relatively close spatial relationships to a serving beam (e.g., that have a similar direction relative to the base station) and thus are likely to have better channel quality than other beams (e.g., beams that point in a direction away from the UE). The subset of prioritized beams may be measured in a best-efforts manner, which may result in some stale measurements. Further, in cases where there is relatively fast mobility, or relatively slow mobility, such techniques may be inefficient and not provide measurements of better beams at a particular time. For example, in high mobility scenarios, relatively fast beam switching may be needed to maintain a reliable connection, and existing best-effort measurement techniques may not provide current measurements of prioritized beams for accurate comparison to a serving beam. In low mobility scenarios, fewer beam switches may be needed, and existing prioritization techniques may not provide diversity of measurements such that if the prioritized beams are blocked (e.g., due to hand blockage) a better beam may not be identified and performance may be degraded.

In accordance with various aspects described herein, techniques are provided for more efficient beam measurement in high mobility and low mobility scenarios. In high mobility scenarios, a number of the prioritized beams may be scheduled for measurement at a same periodicity as measurements of a serving beam (e.g., a virtual serving UE beam (VSUEb)). Such techniques provide that up to a maximum number (e.g., N=3) beams having a measured signal strength within a range of the serving beam signal strength (e.g., within X dB) are scheduled for measurement at the same periodicity as the serving beam. Each measurement interval measures the serving beam and identified prioritized beams, and one or more other beams if there is a measurement occasion that is unused by identified prioritized beams. A beam switch may be triggered based on channel quality of a measured beam exceeding the serving beam (e.g., better than the serving beam by a defined margin). The prioritized beams are thus measured at a same periodicity as the serving beam, which provides more equivalent comparisons of the beams and more efficient beam switching, particularly in high-mobility situations.

In some low mobility cases, a set of layer one beams (which also may be referred to as max-level beams or top-level beams) may be measured at a relatively slow cadence. In some cases, the layer one beams may be measured based on a measured mobility being less than a threshold value. In the event that the beams at a UE associated with a codebook hierarchy share a common beam obstruction or interference issue (e.g., due to hand obstruction), one of the layer one beams may have better channel characteristics, which may be used to trigger a beam switch. In some cases, the layer one beams may be measured at a cadence of one beam per measurement occasion, which provides a substantially lower sampling rate than for the codebook hierarchy beams, but allows for enhanced diversity of beam measurements in the event of beam obstruction at the codebook hierarchy beams. In cases where such measurements are initiated based on a UE mobility being less than a threshold value, it is likely that even relatively old measurements of the layer one beams will still be useful to trigger a beam switch in the event of obstruction or interference.

The present techniques improve system performance by providing beam measurements that may be more reliable for use in beam switching evaluations. In some cases, described techniques may support improvements in system efficiency such that the battery performance and system performance of a device is increased. Additionally, described techniques may result in reducing a time it takes for beam switch determinations, and may result in switching to more preferable beams in the event of a beam switch. Such techniques may thus provide increased throughput, reduced latency, improved user experience, longer battery life, and improved quality and reliability of service.

Aspects of the disclosure are initially described in the context of wireless communications systems. Aspects of the disclosure are further illustrated by and described with reference to measurement timings, apparatus diagrams, system diagrams, and flowcharts that relate to techniques for beam selection based on measurement periodicities.

FIG. 1 illustrates an example of a wireless communications system 100 that supports techniques for beam selection based on measurement periodicities in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, one or more UEs 115 may perform beam measurements subsequent to establishing communications with a serving beam. Such measurements may measure the serving beam as well as other beams, in order to monitor the beams and initiate beam switching in the event of degradation of the serving beam. In order to avoid having to measure each beam that may be transmitted by a base station 105, such UEs 115 may identify a subset of beams for measurement, such as based on a codebook hierarchy. In some cases, a UE 115 may identify one or more prioritized beams that may be scheduled for measurement at a same periodicity as measurements of a serving beam. In some cases, up to a maximum number (N) beams having a measured signal strength within a range of the serving beam signal strength (e.g., within X dB) may be scheduled for measurement at the same periodicity as the serving beam. A beam switch may be triggered based on channel quality of a measured beam exceeding the serving beam (e.g., better than the serving beam by a predetermined margin). In some low mobility cases, a set of layer one beams (e.g., maximum-level beams or top level beams) may be measured by a UE 115 according to a periodic interval based on a measured mobility being less than a threshold value. In some cases, each layer one beam may be measured at a cadence of one beam per measurement occasion.

Figure 2:
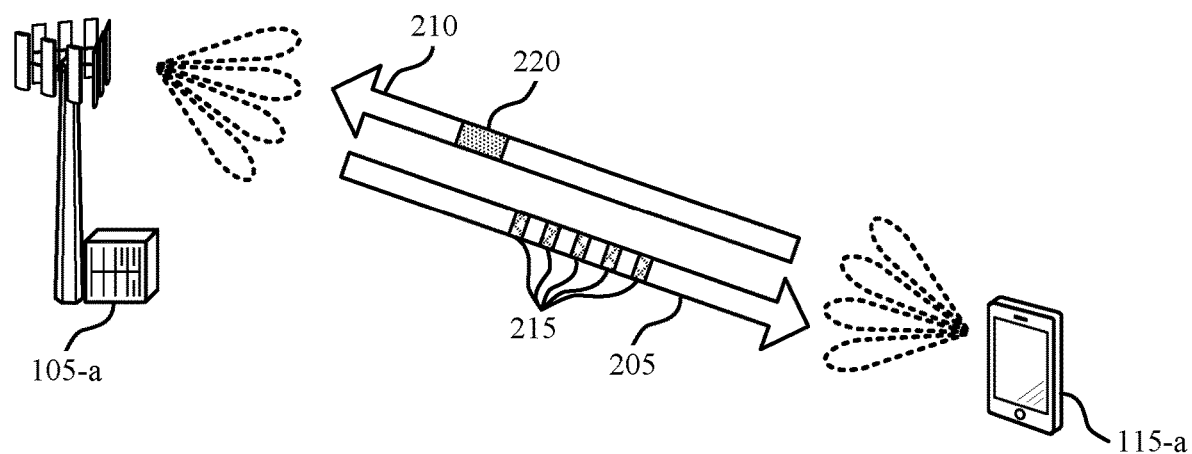
FIG. 2 illustrates an example of a portion of a wireless communications system that supports techniques for beam selection based on measurement periodicities in accordance with aspects of the present disclosure.

FIG. 2 illustrates an example of a wireless communications system 200 that supports techniques for beam selection based on measurement periodicities in accordance with aspects of the present disclosure. As illustrated, wireless communications system 200 may include UE 115-a and base station 105-a, which may be examples of a UE 115 or a base station 105, as described above with reference to FIG. 1. Wireless communications system 200 may also include downlink 205 and uplink 210. Base station 105-a may use downlink 205 to convey control and/or data information to UE 115-a. And UE 115-a may use uplink 210 to convey control and/or data information to base station 105-a. In some cases, downlink 205 may use different time and/or frequency resources than uplink 210.

In some examples, UE 115-a may communicate with base station 105-a (e.g., via downlink 205 and uplink 210) using beamformed communications. In some cases, the base station 105 may provide configuration information to the UE 115-a that may configure UE 115-a to monitor synchronization signal blocks (SSBs) 215 that are transmitted using different beams (e.g., each SSB 215 may be associated with a beam index of a beam codebook that may be preconfigured or provided by the base station 105-a). The UE 115-a may measure reference signals in the SSBs 215 and use the measurements to identify signal strength (e.g., based on reference signal received power (RSRP)), associated with different beams. Such measurements may be transmitted to the base station 105-a in one or more measurement reports 220, and in some cases a beam switch may be initiated based on the beam measurements (e.g., based on a serving beam having degraded such that a different beam is more suitable for communications).

In some cases, the UE 115-a may scan beams of SSBs 215 in a periodic manner to monitor beam strength of different beams. For example, UE 115-a may scan beams according to the configured codebook and identify a suitable beam for uplink/downlink data communication. In some cases, the total number of UE beams in the codebook may be relatively large, such as 40-100 beams in some deployments. In some cases, the UE 115-a may simply measure each beam in a round-robin manner and monitor beam strengths.

However, such techniques may introduce a relatively large delay in finding a best beam (e.g., if the UE 115-a measures 100 beams and a SSB 215 periodicity is one SSB 215 per 20 ms, measurements of all beams would take 2 seconds). Such delays may result in older measurements becoming stale (e.g., due to UE 115-a rotation or movement), and thus unreliable.

In some cases, the UE 115-a may prioritize a subset of beams for measurement, in order to measure beams that have a higher likelihood of being suitable for communications more frequently. For example, a codebook hierarchy may be used to identify the subset of beams (which may be an example of a first subset of beams) as a union of all adjacent beam relationships, determined through freespace beam characteristics. For example, the subset of beams may include a best beam (e.g., based on boresight in line of sight (LoS), or in terms of measurement metric), the best beams parent (e.g., a higher level beam having a larger beamwidth) and any higher level beams of the parent, one or more neighboring beams of the parent (e.g., an adjacent spatial beam), one or more neighboring beams of the best beam, and one or more child beams of the best beam (e.g., narrower beamwidth beams within a beamwidth of the best beam). Such a codebook hierarchy allows for more frequent measurements of beams that have a higher likelihood of being suitable for communications, and may thus enhance performance and reliability of communications.

Further, in some cases, one or more beams having higher measurement metrics (e.g., higher RSRP or signal to noise ratio (SNR) measurements) may be identified and the UE 115-a may use best-effort scheduling to measure such beams. However, such best-effort scheduling may not provide a regular cadence to any candidate (e.g., potential serving) beams, as the number of prioritized beams is dynamic (e.g., depends on the UE motion state, channel quality, etc.). Further, layer one (L1) filtering may be performed on the measured beams to normalize the measurements across beams and beamwidths, for comparison purposes, and the filtering may use one or more coefficients that are adapted to actual sampling rate. In cases where a beam is measured at a lower periodicity than the serving beam (e.g., the serving beam may be measured at each measurement occasion and a prioritized beam of the subset of beams may be measured less frequently), L1 filtering may result in beams with fewer measurements being given lower weight than the serving beam and there may be a bias towards the serving beam. Thus, a beam switch or measurement report 220 may be less reliable due to the instantaneous or insufficiently filtered measurements, staleness from irregular best-effort TDM sampling, or any combinations thereof. Additionally, a subset of beams identified based on the codebook hierarchy may result in a local maxima being identified that is impacted by obstructions or interference (e.g., a hand blockage may impact beams identified by the codebook hierarchy). In some cases, such codebook hierarchy techniques may be further enhanced to provide beam measurements that have increased reliability, diversity, or both.

In some cases, based on a mobility of the UE 115-a, one or more beams may be selected for measurement at more frequent intervals than would be provided if using the codebook hierarchy alone. In some cases, the UE 115-a may experience relatively high mobility (e.g., relatively fast movement or rotation relative to beam directions of the base station 105-a), and beam measurements for certain beams may be stale or relatively infrequent, and thus may not identify a beam that may be the most suitable for communications. In some cases, the UE 115-a may identify one or more beams that are to be measured at a same cadence as the serving beam. For example, a first beam may be identified as having a RSRP that exceeds other beams (e.g., a beam from a subset of beams that are prioritized such as based on the codebook hierarchy), and the first beam may be measured at a same cadence as the serving beam (e.g., on a per-SSB basis). In some cases, the serving beam (e.g., VSUEb) may be maintained on per-SSB basis, and measurements provided in the measurement report 220 (e.g., an L1/L3 report that indicates a best UE beam on each SSB 215). By measuring the first beam (and optionally one or more other beams having measurements that meet a threshold criteria), consistent sampling and filtering for the top one or more beams that compete with the serving beam may be provided, which may allow for a more even comparison of beams when evaluating beam switch criteria. An example of such beam measurements is discussed with reference to FIG. 3.

In some cases, additionally or alternatively to the identification of beams to be measured at a same periodicity as the serving beam, the UE 115-*a* may identify a subset of beams (which may be an example of a second subset of beams) that include all maximum-level or top level beams in the beam codebook (e.g., L1 beams). The UE 115-*a* may measure each of the beams in this subset of beams in a round-robin manner over a time period (e.g., a period of T ms), which may be set to be a relatively large period in order to not have a substantial impact on mobility tracking (e.g., measurements made with beam prioritizing). For example, one maximum-level beam may be measured per measurement interval at the UE 115-*a* (e.g., one max-level beam measurement per measurement report 220). Remaining measurement occasions of the measurement interval may be used for measurement of higher priority beams or beams identified based on the codebook hierarchy. Such techniques may thus provide relatively slow measurement updates for each top level beam, which may allow the UE 115-*a* to avoid being stuck at a local maxima of the higher priority beams (e.g., in the event of a hand blockage or other interference). In cases where the UE 115-*a* have a relatively low mobility, such longer periodicity measurements may have a relatively long period of usefulness. In some cases, if inertial measurement unit (IMU) sensor information is available (or other information that indicates the UE 115-*a* is stationary or has a mobility that is less than a threshold value), the UE 115-*a* may enable such long period measurements only when stationary or moving relatively slowly. Such techniques may improve throughput performance in stationary/low mobility scenarios by ensuring fairness among beam directions.

Figure 3:
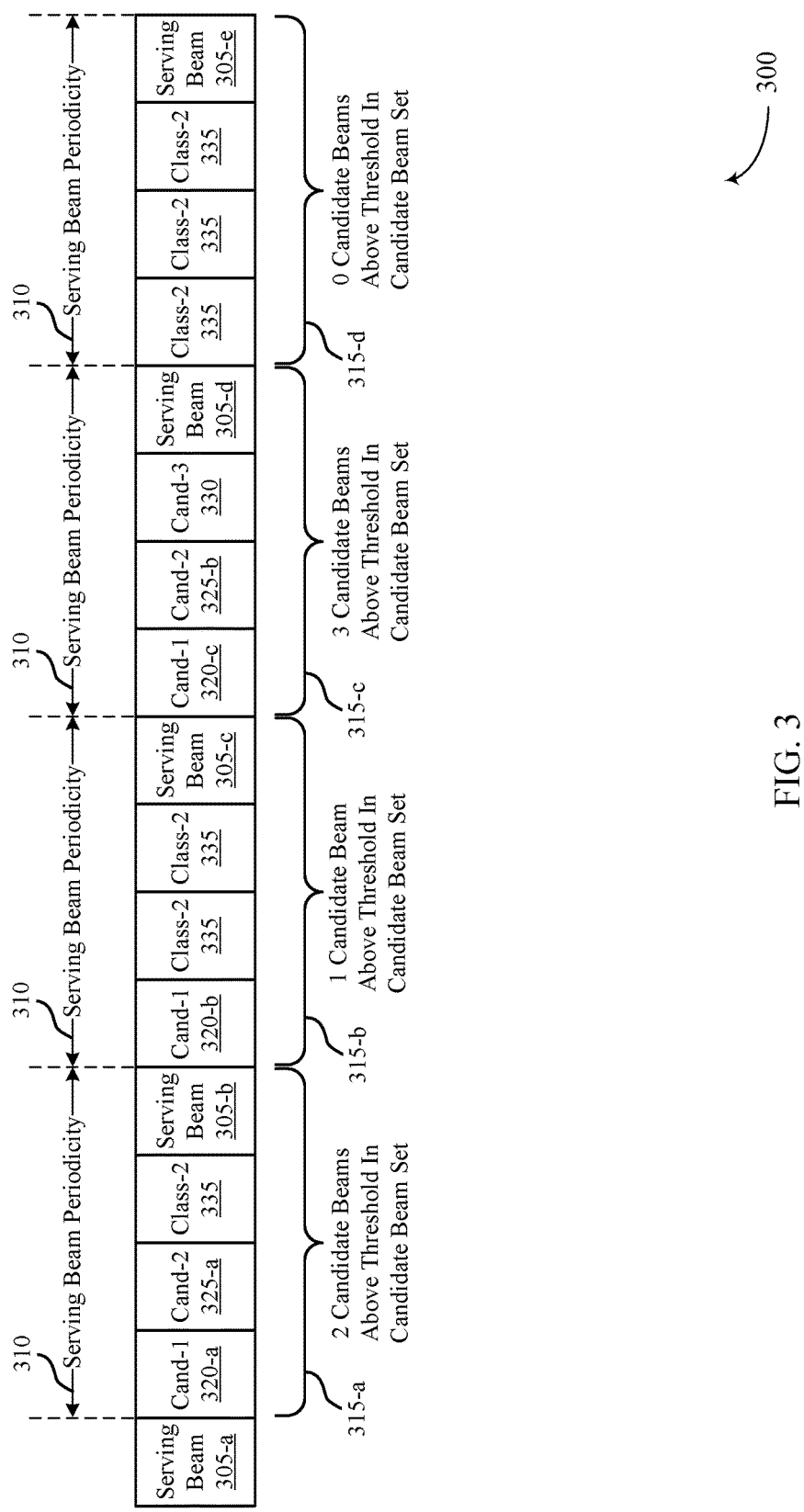
FIG. 3 illustrates an example of a beam measurement interval that supports techniques for beam selection based on measurement periodicities in accordance with aspects of the present disclosure.

FIG. 3 illustrates an example of a beam measurement interval 300 that supports techniques for beam selection based on measurement periodicities in accordance with aspects of the present disclosure. The beam measurement interval 300 may be implemented by a UE as described herein (e.g., a UE 115 of FIG. 1 or 2).

In this example, a serving beam may have serving beam measurement occasions 305 that may occur on a per-SSB basis (e.g., providing serving beam measurement occasions 305-*a* through 305-*e*) and thus have a serving beam periodicity 310. Further, one or more beams may be identified for measurement at a same periodicity as the serving beam, as discussed herein. For example, the UE may keep up to N candidate beams (e.g., N=3 in the example of FIG. 3) that are at least X dB below the serving beam (e.g., within 1 dB below VSUEb) in a prioritized subset of beams (e.g., in a second subset of beams, which may include beams within or outside of a first subset of beams identified based on a codebook hierarchy). Each of the identified prioritized candidate beams may be scheduled for measurement with the same cadence as the serving beam update, such that the serving beam and each identified prioritized candidate get updated after each round 315 of scheduling.

In the example of FIG. 3, in a first round 315-*a*, a first candidate beam may be measured in first measurement occasion 320-*a*, and a second candidate beam may be measured in second measurement occasion 325-*a*, based on the first and second candidate beams having a measured power above the threshold value relative to a measurement of the serving beam. In this example, the first round 315-*a* may have four measurement occasions which results in one additional class-2 measurement occasion 335 that is available, which may be used to measure another beam (e.g., another beam of the first subset of beams that is identified based on the codebook hierarchy). In a second round 315-*b* of measurements, in this example, only the first candidate beam is measured in first measurement occasion 320-*b*, based on the second candidate beam having a measurement that dropped below the threshold value, and thus two class-2 measurement occasions 335 are available in the second round 315-*b* of measurements. In this example, the third round 315-*c* may include three candidate beams (e.g., first candidate beam measured in first measurement occasion 320-*c*, second candidate beam measured in second measurement occasion 325-*b*, and third candidate beam measured in third measurement occasion 330) that are measured based on the first candidate beam, the second candidate beam, and a third candidate beam having measured power above the threshold value. In a fourth round 315-*d*, no prioritized candidate beams may be measured and thus three class-2 measurement occasions 335 may be available, based on no beams having measured power above the threshold value in the prior round of measurements.

Such techniques may allow for increased frequency and reliability of measurements of candidate beams having relatively good measured power. By consistently sampling one or more top candidate beams, and letting these beams compete with the serving beam at a same sampling frequency, beam switch determinations may be more reliable and faster beam switching to preferable beams may be achieved.

Figure 4:
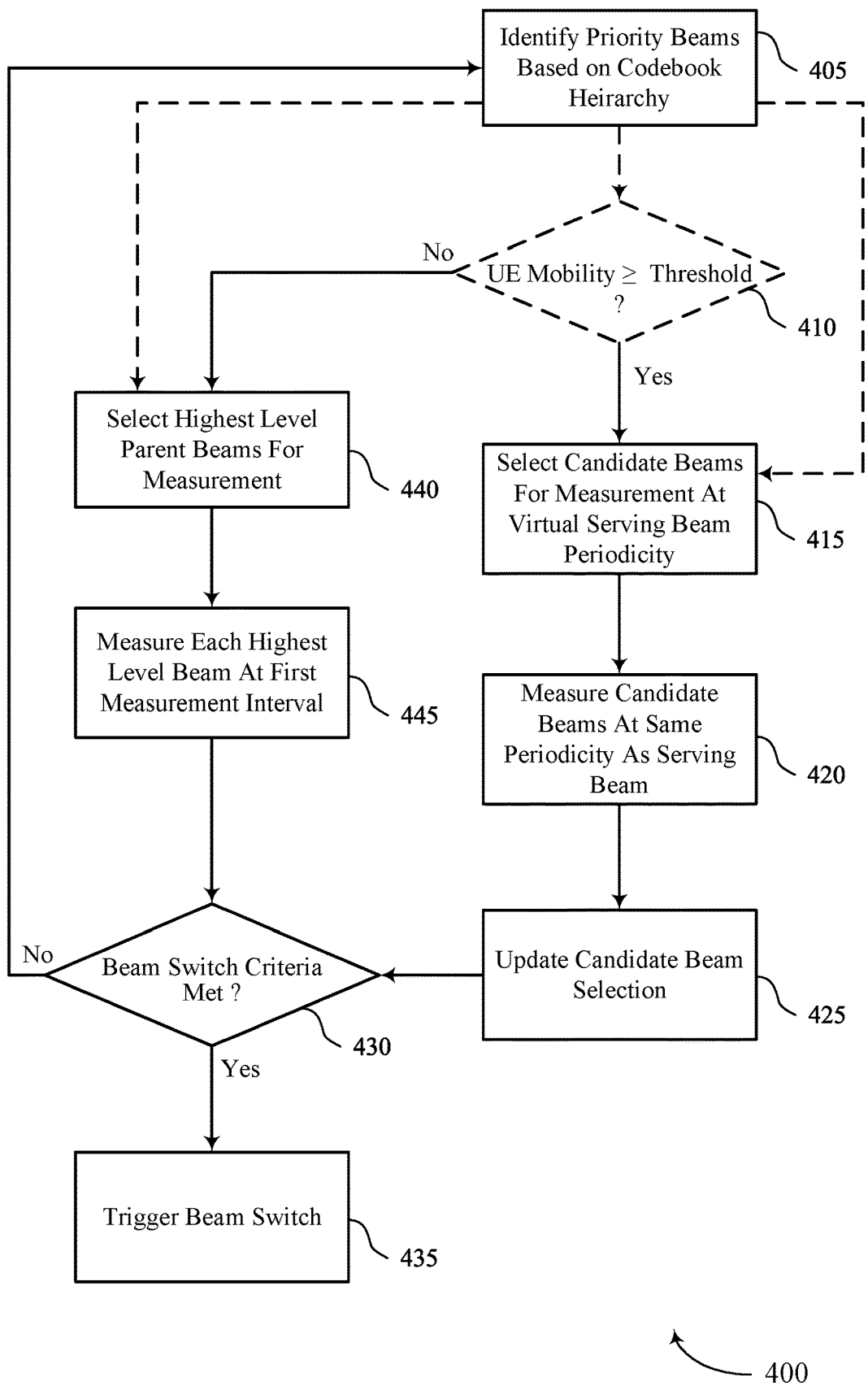
FIG. 4 illustrates an example of a flowchart that supports techniques for beam selection based on measurement periodicities in accordance with aspects of the present disclosure.

FIG. 4 illustrates an example of a flowchart 400 that supports techniques for beam selection based on measurement periodicities in accordance with aspects of the present disclosure. In some examples, the operations of flowchart 400 may be implemented by aspects of a wireless communications 100 or a wireless communications system 200, as described with reference to FIGS. 1 and 2. For example, the operations of the flowchart 400 may be performed by a UE 115 as described with reference to FIGS. 1 and 2. Alternative examples of the following may be implemented in which some processes are performed in a different order than described or are not performed at all. In some examples, the processes may include additional features not mentioned below, or further processes may be added. In some examples, a UE may execute a set of instructions to control the functional elements of the UE to perform the described functions. Additionally or alternatively, the UE may perform aspects of the described functions using special-purpose hardware.

At 405, the UE may identify priority beams based on a codebook hierarchy. In some cases, the UE may be configured with a codebook of beams. The priority beams, which may be a first subset of beams, may be determined based on a serving beam, or best measured beam, and a union of all adjacent beam relationships, determined through freespace beam characteristics. For example, the subset of beams may include a best beam (e.g., based on boresight in LoS, or in terms of measurement metric), the best beams parent (e.g., a higher level beam having a larger beamwidth) and any higher level beams of the parent, one or more neighboring beams of the parent (e.g., an adjacent spatial beam), one or more neighboring beams of the best beam, and one or more child beams of the best beam (e.g., narrower beamwidth beams within a beamwidth of the best beam).

At 410, in some cases, the UE may determine if the UE mobility (e.g., UE translational movement, rotation, or both) exceeds a threshold value. In some cases, input from an IMU sensor may be used to determine UE mobility. In some cases, the threshold value may be associated with a number of beam changes that may be expected based on a particular level of sensed UE mobility. For example if configured L3 beams have a certain beamwidth, beam changes may be expected to occur more or less quickly based on UE movement levels. In some cases, the UE may be preconfigured with an IMU sensor threshold based on L3 beamwidth, which may be used to determine the UE mobility relative to the threshold value. In other cases, historical data related to UE mobility and a rate of change of beams may be used to set the threshold value (e.g., through machine learning algorithms at the UE). In some cases, two threshold values may be set, and UE mobility that exceeds a high threshold value may trigger selection of beams for measurement at a same cadence as a serving beam, such as discussed with reference to FIGS. 2 and 3; and a UE mobility that does not exceed a low threshold value may trigger top-level beam measurements at a relatively slow cadence, as discussed with reference to FIG. 2.

At 415, the UE may select one or more candidate beams for measurement at a virtual serving beam periodicity. Such a selection, in some cases, may be triggered based on the UE mobility exceeding the threshold. In other cases, such a selection may be made only based on measured power levels of the candidate beams being within a measured level of the serving beam, irrespective of UE mobility.

At 420, the UE may measure the selected candidate beams at a same periodicity as the serving beam. Such measurements may provide that the selected candidate beams and the serving beam are evaluated based on same measurement criteria, which may provide for enhanced determination of beam switching. At 425, the UE may update the candidate beam selection based on the measured candidate beams. In some cases, if a measured candidate beam has a measured power level that is less than a certain level from the serving beam, that beam may be dropped from the selected candidate beams for the next round of measurements. Likewise, if a different beam (e.g., another beam based on the codebook hierarchy) is measured that meets the selection criteria, that different beam may be added to the selected candidate beams for the next round of measurements.

At 430, it is determined if beam switch criteria are met. In some cases, beam switch criteria may be based on a measured beam having a measured power or SNR that exceeds the serving beam by a threshold amount. At 435, in the event that the beam switch criteria are met, a beam switch may be triggered. If the beam switch criteria are not met, operations may continue at 405. In some cases, the UE may provide a measurement report to a base station, and the base station may perform the operations of 430 and 435. In other cases, the UE may determine to trigger a beam switch itself At 440, the UE may select highest level parent beams (e.g., L1 beams, max-level beams, or top level beams) for measurement. In some cases, such a selection may be based on the UE mobility being less than the mobility threshold as determined at 410, which may indicate that the UE is stationary or moving slowly, such that beam measurements are not expected to change significantly for a relatively long time period. At 445, the UE may measure each highest level beam at a first measurement interval. In some cases, the UE may measure one highest level beam in each round of measurements. In such cases, the beam switch criteria determination at 430 may be based on the measured highest level beams, such that measurement diversity may be provided in order to avoid a local maxima that may be impacted by a hand blockage or other interference with the beams that are identified at 405. The operations at 430 and 435 may then be performed, as discussed above.

Figure 5:
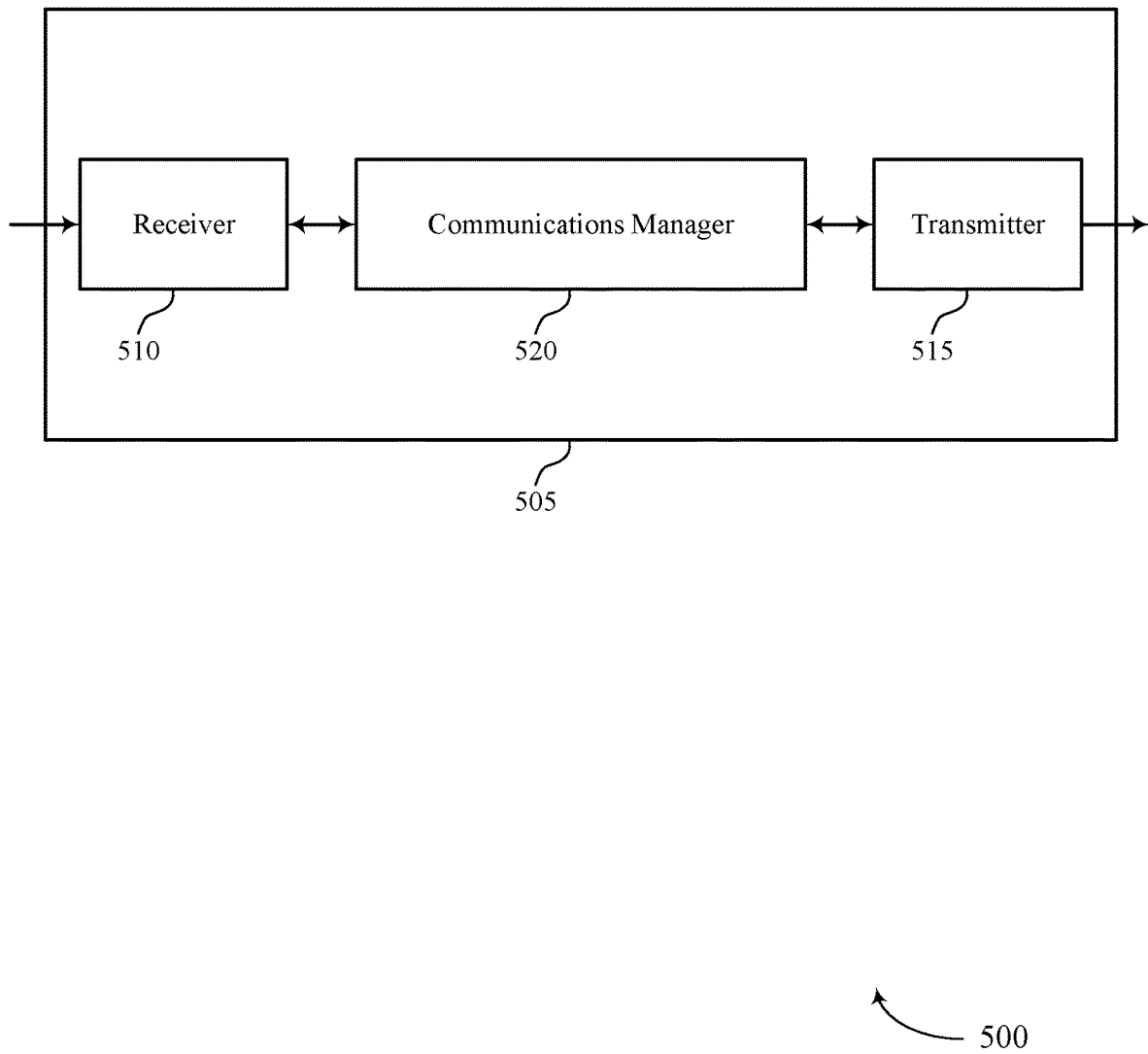
FIGS. 5 and 6 show block diagrams of devices that support techniques for beam selection based on measurement periodicities in accordance with aspects of the present disclosure.

FIG. 5 shows a block diagram 500 of a device 505 that supports techniques for beam selection based on measurement periodicities in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for beam selection based on measurement periodicities). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for beam selection based on measurement periodicities). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for beam selection based on measurement periodicities as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for measuring first channel characteristics of a serving beam according to a first periodicity associated with transmission of one or more reference signals using the serving beam. The communications manager 520 may be configured as or otherwise support a means for selecting one or more candidate beams from a set of available beams for measurement according to the first periodicity, the one or more candidate beams selected based on a signal strength of beams of the set of available beams. The communications manager 520 may be configured as or otherwise support a means for measuring second channel characteristics of each of the one or more candidate beams according to the first periodicity. The communications manager 520 may be configured as or otherwise support a means for triggering a beam switch to a first candidate beam of the one or more candidate beams based on the first channel characteristics of the serving beam being below a threshold value.

Additionally or alternatively, the communications manager 520 may support wireless communication at a UE in accordance with examples as disclosed herein. For example, the communications manager 520 may be configured as or otherwise support a means for selecting a first subset of beams from a set of available beams based on codebook hierarchy associated with a first beam that has one or more channel metrics that exceed corresponding channel metrics of other beams of the set of available beams, where the first subset of beams are prioritized for channel measurements. The communications manager 520 may be configured as or otherwise support a means for determining that a mobility of the UE is less than a threshold value. The communications manager 520 may be configured as or otherwise support a means for selecting, based on the determining, a second subset of beams from the set of available beams, the second subset of beams including highest level parent beams of the set of available beams. The communications manager 520 may be configured as or otherwise support a means for measuring channel characteristics for each beam of the first subset of beams at a first measurement interval, and measuring channel characteristics for each beam of the second subset of beams at a second measurement interval that has a longer periodicity than the first measurement interval. The communications manager 520 may be configured as or otherwise support a means for triggering a beam switch to a first candidate beam of the second subset of beams based on the first candidate beam having measured channel characteristics that exceed corresponding channel characteristics of each beam of the first subset of beams.

Additionally or alternatively, the communications manager 520 may support wireless communication at a UE in accordance with examples as disclosed herein. For example, the communications manager 520 may be configured as or otherwise support a means for identifying a first subset of beams from a set of available beams for channel measurements based on a first serving beam used for communications with a base station. The communications manager 520 may be configured as or otherwise support a means for selecting, based on a mobility of the UE, a second subset of beams that includes one or more other beams outside of the first subset of beams for periodic channel measurements, where the second subset of beams includes a prioritized subset of beams based on previous measurement metrics or top-level beams included in a codebook of beams. The communications manager 520 may be configured as or otherwise support a means for measuring channel characteristics for the first subset of beams and the second subset of beams at a measurement interval. The communications manager 520 may be configured as or otherwise support a means for triggering a beam switch to a first candidate beam of the first subset of beams or the second subset of beams based on the first candidate beam having higher measured channel characteristics than other measured channel characteristics of the first subset of beams and the second subset of beams.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for beam measurements that may be more reliable for use in beam switching evaluations, which may provide a reduced amount of time for beam switch determinations and switching to more preferable beams in the event of a beam switch, and thus allow for increased throughput, reduced latency, improved user experience, longer battery life, and improved quality and reliability of service.

Figure 6:
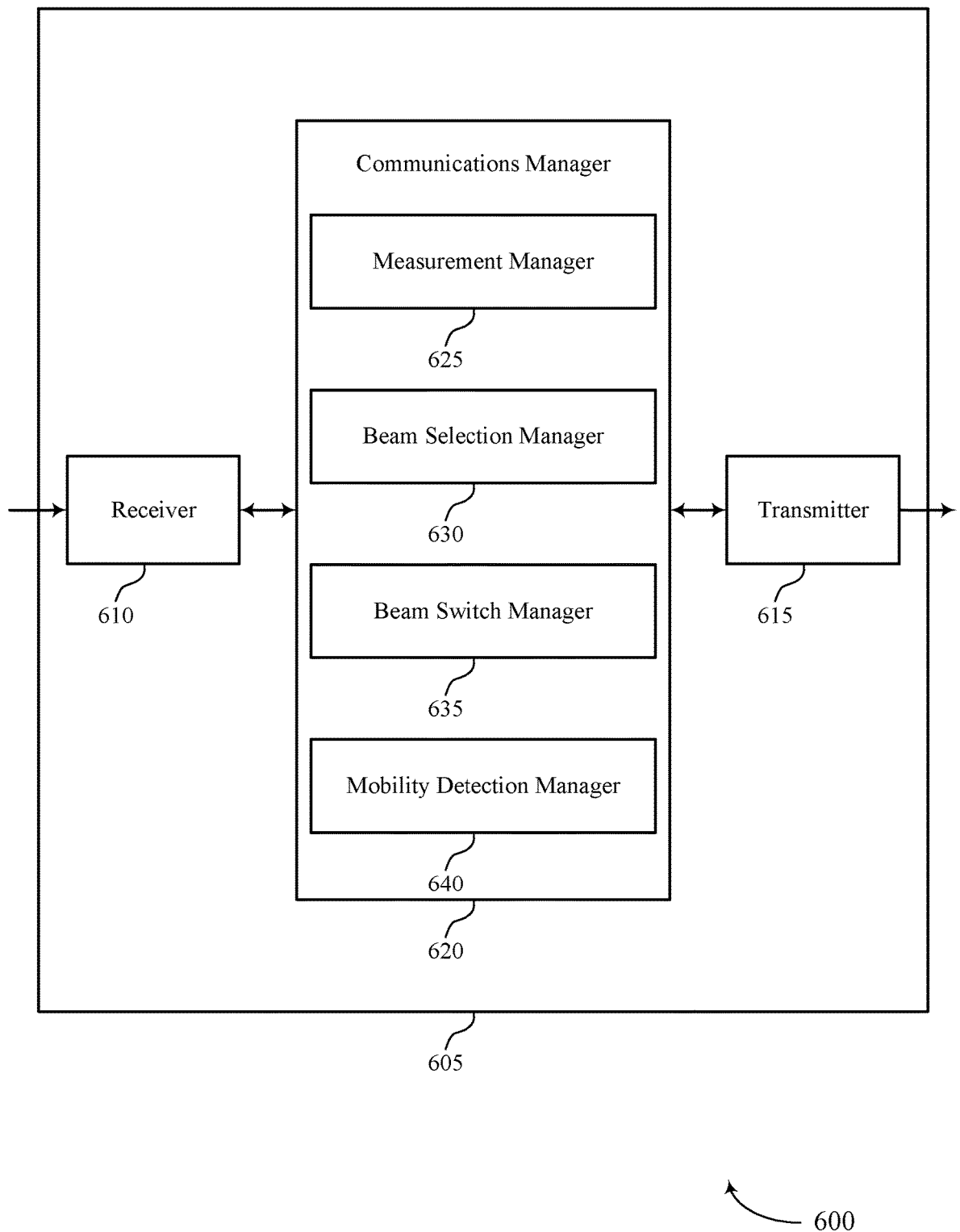

FIG. 6 shows a block diagram 600 of a device 605 that supports techniques for beam selection based on measurement periodicities in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for beam selection based on measurement periodicities). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for beam selection based on measurement periodicities). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for beam selection based on measurement periodicities as described herein. For example, the communications manager 620 may include a measurement manager 625, a beam selection manager 630, a beam switch manager 635, a mobility detection manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The measurement manager 625 may be configured as or otherwise support a means for measuring first channel characteristics of a serving beam according to a first periodicity associated with transmission of one or more reference signals using the serving beam. The beam selection manager 630 may be configured as or otherwise support a means for selecting one or more candidate beams from a set of available beams for measurement according to the first periodicity, the one or more candidate beams selected based on a signal strength of beams of the set of available beams. The measurement manager 625 may be configured as or otherwise support a means for measuring second channel characteristics of each of the one or more candidate beams according to the first periodicity. The beam switch manager 635 may be configured as or otherwise support a means for triggering a beam switch to a first candidate beam of the one or more candidate beams based on the first channel characteristics of the serving beam being below a threshold value.

Additionally or alternatively, the communications manager 620 may support wireless communication at a UE in accordance with examples as disclosed herein. The beam selection manager 630 may be configured as or otherwise support a means for selecting a first subset of beams from a set of available beams based on codebook hierarchy associated with a first beam that has one or more channel metrics that exceed corresponding channel metrics of other beams of the set of available beams, where the first subset of beams are prioritized for channel measurements. The mobility detection manager 640 may be configured as or otherwise support a means for determining that a mobility of the UE is less than a threshold value. The beam selection manager 630 may be configured as or otherwise support a means for selecting, based on the determining, a second subset of beams from the set of available beams, the second subset of beams including highest level parent beams of the set of available beams. The measurement manager 625 may be configured as or otherwise support a means for measuring channel characteristics for each beam of the first subset of beams at a first measurement interval, and measuring channel characteristics for each beam of the second subset of beams at a second measurement interval that has a longer periodicity than the first measurement interval. The beam switch manager 635 may be configured as or otherwise support a means for triggering a beam switch to a first candidate beam of the second subset of beams based on the first candidate beam having measured channel characteristics that exceed corresponding channel characteristics of each beam of the first subset of beams.

Additionally or alternatively, the communications manager 620 may support wireless communication at a UE in accordance with examples as disclosed herein. The beam selection manager 630 may be configured as or otherwise support a means for identifying a first subset of beams from a set of available beams for channel measurements based on a first serving beam used for communications with an access network entity (e.g., a base station). The beam selection manager 630 may be configured as or otherwise support a means for selecting, based on a mobility of the UE, a second subset of beams that includes one or more other beams outside of the first subset of beams for periodic channel measurements, where the second subset of beams includes a prioritized subset of beams based on previous measurement metrics or top-level beams included in a codebook of beams. The measurement manager 625 may be configured as or otherwise support a means for measuring channel characteristics for the first subset of beams and the second subset of beams at a measurement interval. The beam switch manager 635 may be configured as or otherwise support a means for triggering a beam switch to a first candidate beam of the first subset of beams or the second subset of beams based on the first candidate beam having higher measured channel characteristics than other measured channel characteristics of the first subset of beams and the second subset of beams.

Figure 7:
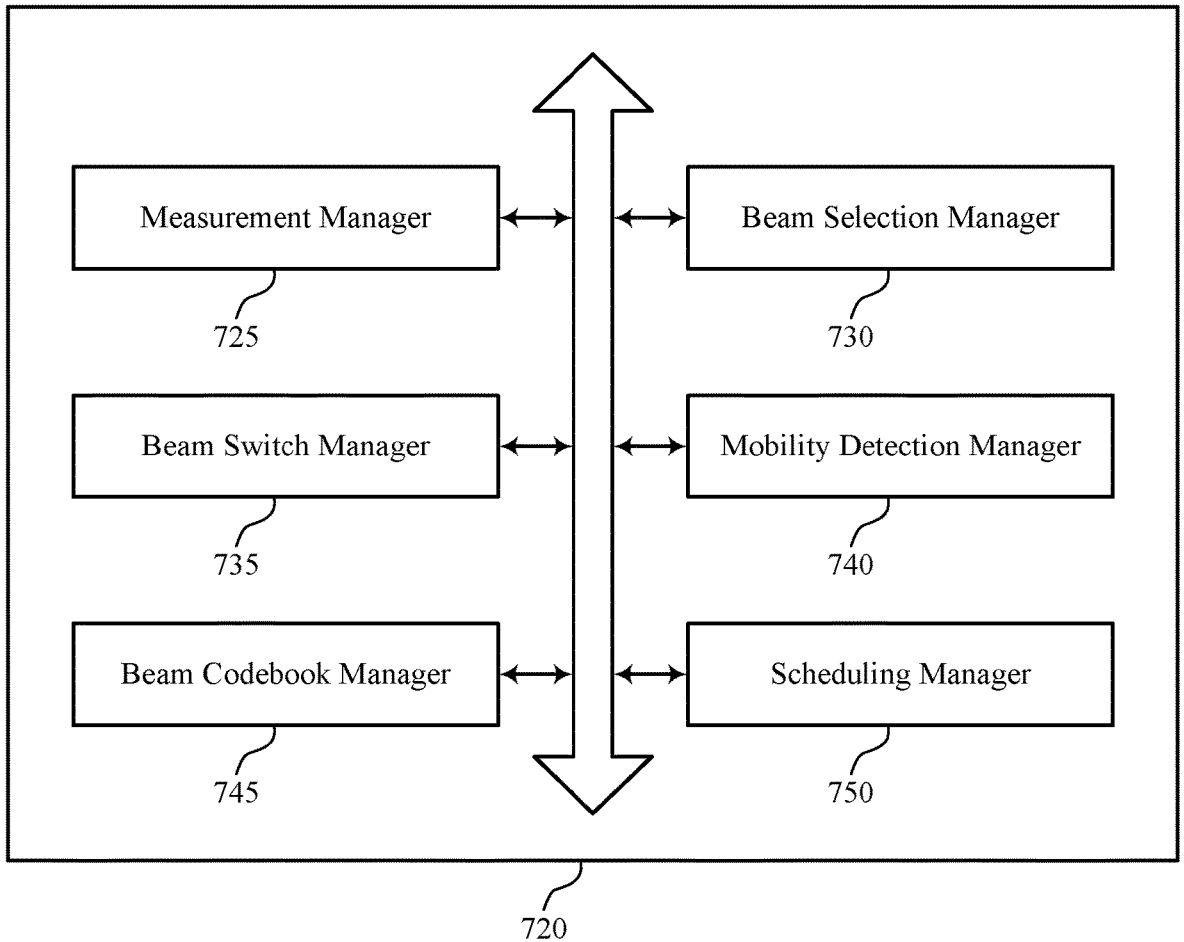
FIG. 7 shows a block diagram of a communications manager that supports techniques for beam selection based on measurement periodicities in accordance with aspects of the present disclosure.

FIG. 7 shows a block diagram 700 of a communications manager 720 that supports techniques for beam selection based on measurement periodicities in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for beam selection based on measurement periodicities as described herein. For example, the communications manager 720 may include a measurement manager 725, a beam selection manager 730, a beam switch manager 735, a mobility detection manager 740, a beam codebook manager 745, a scheduling manager 750, or any combination thereof. Each of these components may communicate, directly or indirectly, with one another (e.g., via one or more buses).

The communications manager 720 may support wireless communication at a UE in accordance with examples as disclosed herein. The measurement manager 725 may be configured as or otherwise support a means for measuring first channel characteristics of a serving beam according to a first periodicity associated with transmission of one or more reference signals using the serving beam. The beam selection manager 730 may be configured as or otherwise support a means for selecting one or more candidate beams from a set of available beams for measurement according to the first periodicity, the one or more candidate beams selected based on a signal strength of beams of the set of available beams. In some examples, the measurement manager 725 may be configured as or otherwise support a means for measuring second channel characteristics of each of the one or more candidate beams according to the first periodicity. The beam switch manager 735 may be configured as or otherwise support a means for triggering a beam switch to a first candidate beam of the one or more candidate beams based on the first channel characteristics of the serving beam being below a threshold value. In some examples, the measurement of the one or more candidate beams at the first periodicity provides consistent sampling and filtering of the one or more candidate beams and the serving beam for equivalent comparison of associated channel characteristics. In some examples, to support measuring the channel characteristics for the serving beam and for each of the one or more candidate beams, the measurement manager 725 may be configured as or otherwise support a means for measuring the channel characteristics of each beam on a per-SSB basis. In some examples, the one or more candidate beams include up to a determined quantity of beams of the set of available beams that are within a measurement difference threshold of the serving beam.

In some examples, the beam selection manager 730 may be configured as or otherwise support a means for updating the selected one or more candidate beams after each measurement period of the first periodicity. In some examples, each measurement period includes a set of measurement occasions and one or more beams other than the one or more candidate beams are measured in a measurement period when fewer candidate beams than measurement occasions are present. In some examples, one or more beams of the set of available beams other than the one or more candidate beams are selected for inclusion in a prioritized subset of beams based on one or more previous measurement metrics, a codebook hierarchy, or any combinations thereof. In some examples, the one or more previous measurement metrics identify the prioritized subset of beams as beams having one or more of a RSRP or SNR that exceed corresponding measurement metrics of other beams by a determined amount, and where the codebook hierarchy indicates one or more beams that are associated with the serving beam. In some examples, the selecting of the one or more candidate beams is based on a detected mobility of the UE exceeding a threshold value.

Additionally or alternatively, the communications manager 720 may support wireless communication at a UE in accordance with examples as disclosed herein. In some examples, the beam selection manager 730 may be configured as or otherwise support a means for selecting a first subset of beams from a set of available beams based on codebook hierarchy associated with a first beam that has one or more channel metrics that exceed corresponding channel metrics of other beams of the set of available beams, where the first subset of beams are prioritized for channel measurements. The mobility detection manager 740 may be configured as or otherwise support a means for determining that a mobility of the UE is less than a threshold value. In some examples, the beam selection manager 730 may be configured as or otherwise support a means for selecting, based on the determining, a second subset of beams from the set of available beams, the second subset of beams including highest level parent beams of the set of available beams. In some examples, the measurement manager 725 may be configured as or otherwise support a means for measuring channel characteristics for each beam of the first subset of beams at a first measurement interval, and measuring channel characteristics for each beam of the second subset of beams at a second measurement interval that has a longer periodicity than the first measurement interval. In some examples, the beam switch manager 735 may be configured as or otherwise support a means for triggering a beam switch to a first candidate beam of the second subset of beams based on the first candidate beam having measured channel characteristics that exceed corresponding channel characteristics of each beam of the first subset of beams.

In some examples, the codebook hierarchy indicates one or more parent beams, child beams, neighbor beams, or any combinations thereof, associated with the first beam. In some examples, the first beam is selected based on being associated with a boresight of an antenna panel of the UE that has a LoS with an access network entity antenna, one or more measurement metrics, or any combinations thereof. In some examples, the codebook hierarchy is a union of all adjacent beam relationships to the first beam in a codebook provided by an access network entity based on freespace beam characteristics. In some examples, the second measurement interval corresponds to one beam of the second subset of beams per each first measurement interval. In some examples, each beam of the second subset of beams is measured once per a quantity of second measurement intervals that corresponds to a quantity of beams in the second subset of beams. In some examples, one or more beams of the first subset of beams are scheduled for measurement in measurement occasions that are unused for measurement of one or more beams of the second subset of beams. In some examples, the second measurement interval is selected to provide for one or more measurements of each beam of the first subset of beams at a higher periodicity than measurements of each beam of the second subset of beams. In some examples, the mobility of the UE is determined based on an IMU sensor measurement value, and where the threshold value is associated with a relatively slow or no UE movement as measured at the IMU. In some examples, the measuring channel characteristics for the second subset of beams provides for the beam switch to be performed in an event of a hand blockage associated with the first subset of beams.

Additionally or alternatively, the communications manager 720 may support wireless communication at a UE in accordance with examples as disclosed herein. In some examples, the beam selection manager 730 may be configured as or otherwise support a means for identifying a first subset of beams from a set of available beams for channel measurements based on a first serving beam used for communications with an access network entity. In some examples, the beam selection manager 730 may be configured as or otherwise support a means for selecting, based on a mobility of the UE, a second subset of beams that includes one or more other beams outside of the first subset of beams for periodic channel measurements, where the second subset of beams includes a prioritized subset of beams based on previous measurement metrics or top-level beams included in a codebook of beams. In some examples, the measurement manager 725 may be configured as or otherwise support a means for measuring channel characteristics for the first subset of beams and the second subset of beams at a measurement interval. In some examples, the beam switch manager 735 may be configured as or otherwise support a means for triggering a beam switch to a first candidate beam of the first subset of beams or the second subset of beams based on the first candidate beam having higher measured channel characteristics than other measured channel characteristics of the first subset of beams and the second subset of beams.

In some examples, the second subset of beams includes one or more beams that are selected for inclusion in the prioritized subset of beams based on one or more previous measurement metrics. In some examples, the one or more previous measurement metrics identify the prioritized subset of beams as beams having one or more of a RSRP or SNR that exceed corresponding measurement metrics of other beams by a determined amount. In some examples, the first subset of beams includes one or more parent beams, child beams, neighbor beams, or any combinations thereof, associated with the first serving beam. In some examples, the first serving beam is selected based on being associated with a boresight of an antenna panel of the UE that has a LoS with an access network entity antenna, one or more measurement metrics, or any combinations thereof. In some examples, one or more beams of the first subset of beams are scheduled for measurement in measurement occasions that are unused for measurement of one or more beams of the second subset of beams.

Figure 8:
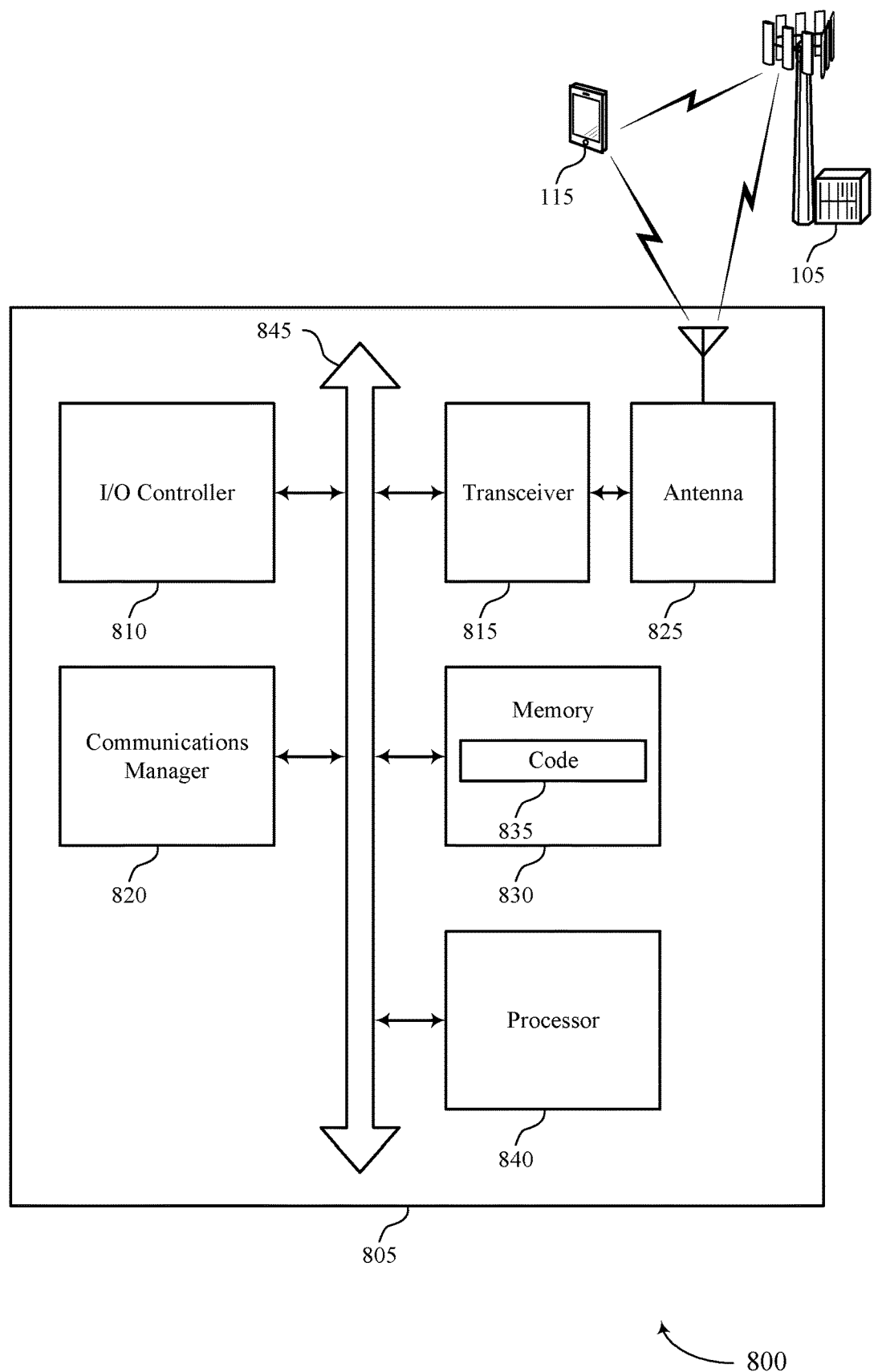
FIG. 8 shows a diagram of a system including a device that supports techniques for beam selection based on measurement periodicities in accordance with aspects of the present disclosure.

FIG. 8 shows a diagram of a system 800 including a device 805 that supports techniques for beam selection based on measurement periodicities in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for beam selection based on measurement periodicities). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for measuring first channel characteristics of a serving beam according to a first periodicity associated with transmission of one or more reference signals using the serving beam. The communications manager 820 may be configured as or otherwise support a means for selecting one or more candidate beams from a set of available beams for measurement according to the first periodicity, the one or more candidate beams selected based on a signal strength of beams of the set of available beams. The communications manager 820 may be configured as or otherwise support a means for measuring second channel characteristics of each of the one or more candidate beams according to the first periodicity. The communications manager 820 may be configured as or otherwise support a means for triggering a beam switch to a first candidate beam of the one or more candidate beams based on the first channel characteristics of the serving beam being below a threshold value.

Additionally or alternatively, the communications manager 820 may support wireless communication at a UE in accordance with examples as disclosed herein. For example, the communications manager 820 may be configured as or otherwise support a means for selecting a first subset of beams from a set of available beams based on codebook hierarchy associated with a first beam that has one or more channel metrics that exceed corresponding channel metrics of other beams of the set of available beams, where the first subset of beams are prioritized for channel measurements.

The communications manager 820 may be configured as or otherwise support a means for determining that a mobility of the UE is less than a threshold value. The communications manager 820 may be configured as or otherwise support a means for selecting, based on the determining, a second subset of beams from the set of available beams, the second subset of beams including highest level parent beams of the set of available beams. The communications manager 820 may be configured as or otherwise support a means for measuring channel characteristics for each beam of the first subset of beams at a first measurement interval, and measuring channel characteristics for each beam of the second subset of beams at a second measurement interval that has a longer periodicity than the first measurement interval. The communications manager 820 may be configured as or otherwise support a means for triggering a beam switch to a first candidate beam of the second subset of beams based on the first candidate beam having measured channel characteristics that exceed corresponding channel characteristics of each beam of the first subset of beams.

Additionally or alternatively, the communications manager 820 may support wireless communication at a UE in accordance with examples as disclosed herein. For example, the communications manager 820 may be configured as or otherwise support a means for identifying a first subset of beams from a set of available beams for channel measurements based on a first serving beam used for communications with an access network entity. The communications manager 820 may be configured as or otherwise support a means for selecting, based on a mobility of the UE, a second subset of beams that includes one or more other beams outside of the first subset of beams for periodic channel measurements, where the second subset of beams includes a prioritized subset of beams based on previous measurement metrics or top-level beams included in a codebook of beams. The communications manager 820 may be configured as or otherwise support a means for measuring channel characteristics for the first subset of beams and the second subset of beams at a measurement interval. The communications manager 820 may be configured as or otherwise support a means for triggering a beam switch to a first candidate beam of the first subset of beams or the second subset of beams based on the first candidate beam having higher measured channel characteristics than other measured channel characteristics of the first subset of beams and the second subset of beams.

By including or configuring the communications manager 820 in accordance with examples as described herein, the device 805 may support techniques for beam measurements that may be more reliable for use in beam switching evaluations, which may provide a reduced amount of time for beam switch determinations and switching to more preferable beams in the event of a beam switch, and thus allow for increased throughput, reduced latency, improved user experience, longer battery life, and improved quality and reliability of service.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for beam selection based on measurement periodicities as described herein, or the processor 840 and the memory 830 may be otherwise configured to perform or support such operations.

Figure 9:
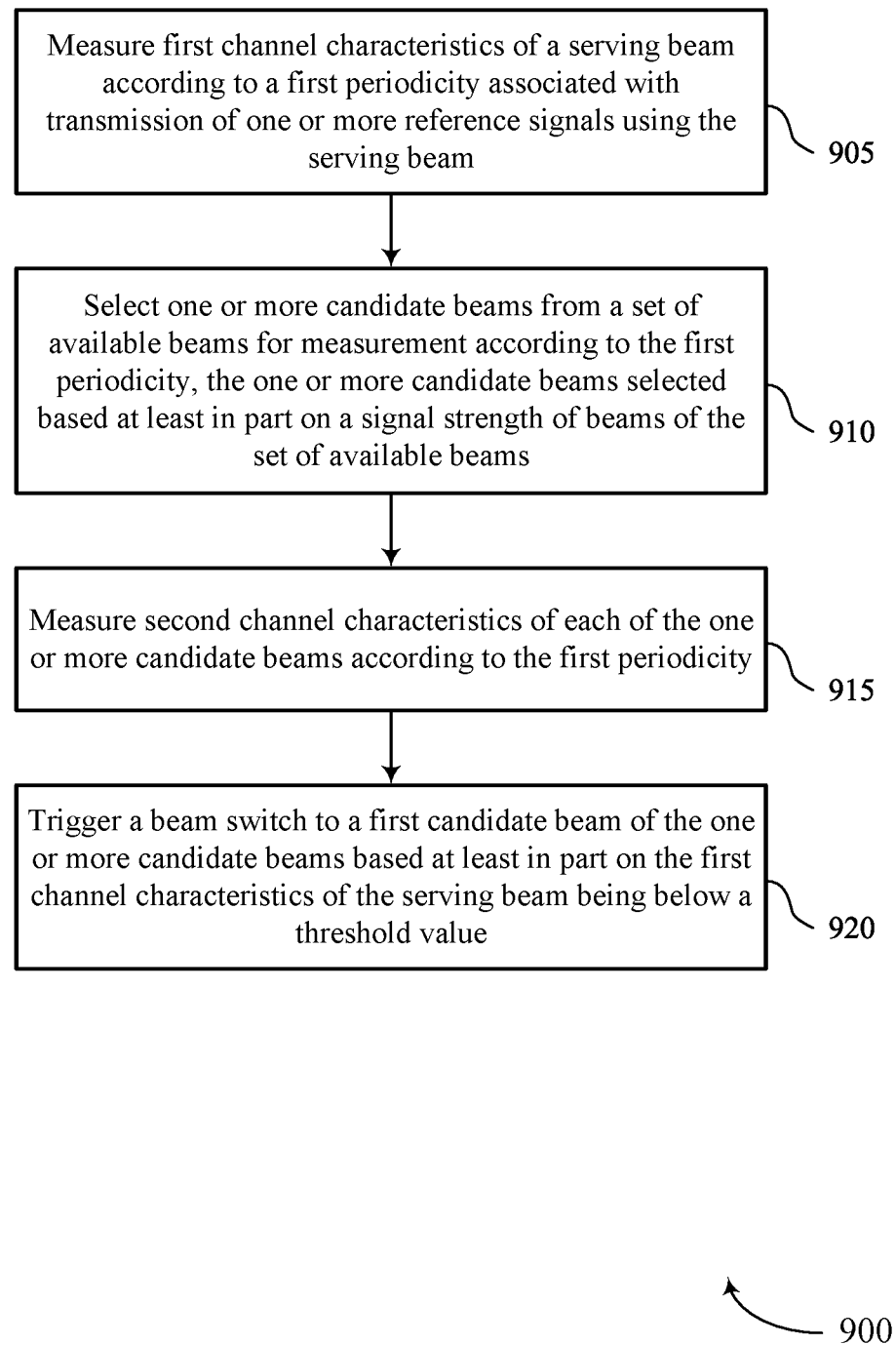
FIGS. 9 through 11 show flowcharts illustrating methods that support techniques for beam selection based on measurement periodicities in accordance with aspects of the present disclosure.

FIG. 9 shows a flowchart illustrating a method 900 that supports techniques for beam selection based on measurement periodicities in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include measuring first channel characteristics of a serving beam according to a first periodicity associated with transmission of one or more reference signals using the serving beam. The operations of 905 may be performed in accordance with examples as disclosed herein. In some examples, aspects of the operations of 905 may be performed by a measurement manager 725 as described with reference to FIG. 7.

At 910, the method may include selecting one or more candidate beams from a set of available beams for measurement according to the first periodicity, the one or more candidate beams selected based on a signal strength of beams of the set of available beams. The operations of 910 may be performed in accordance with examples as disclosed herein. In some examples, aspects of the operations of 910 may be performed by a beam selection manager 730 as described with reference to FIG. 7.

At 915, the method may include measuring second channel characteristics of each of the one or more candidate beams according to the first periodicity. The operations of 915 may be performed in accordance with examples as disclosed herein. In some examples, aspects of the operations of 915 may be performed by a measurement manager 725 as described with reference to FIG. 7.

At 920, the method may include triggering a beam switch to a first candidate beam of the one or more candidate beams based on the first channel characteristics of the serving beam being below a threshold value. The operations of 920 may be performed in accordance with examples as disclosed herein. In some examples, aspects of the operations of 920 may be performed by a beam switch manager 735 as described with reference to FIG. 7.

Figure 10:
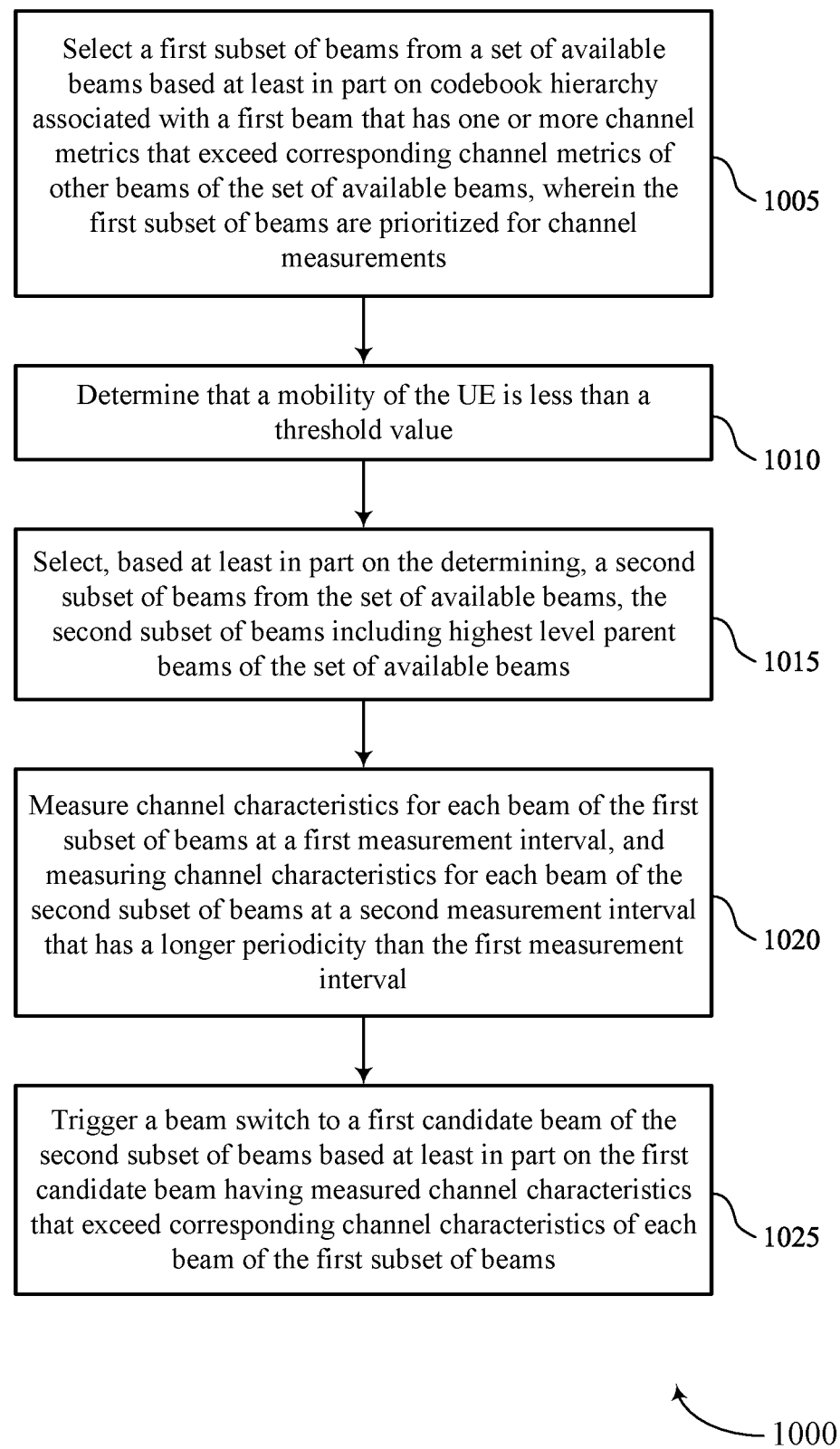

FIG. 10 shows a flowchart illustrating a method 1000 that supports techniques for beam selection based on measurement periodicities in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include selecting a first subset of beams from a set of available beams based on codebook hierarchy associated with a first beam that has one or more channel metrics that exceed corresponding channel metrics of other beams of the set of available beams, where the first subset of beams are prioritized for channel measurements.

The operations of 1005 may be performed in accordance with examples as disclosed herein. In some examples, aspects of the operations of 1005 may be performed by a beam selection manager 730 as described with reference to FIG. 7.

At 1010, the method may include determining that a mobility of the UE is less than a threshold value. The operations of 1010 may be performed in accordance with examples as disclosed herein. In some examples, aspects of the operations of 1010 may be performed by a mobility detection manager 740 as described with reference to FIG. 7.

At 1015, the method may include selecting, based on the determining, a second subset of beams from the set of available beams, the second subset of beams including highest level parent beams of the set of available beams. The operations of 1015 may be performed in accordance with examples as disclosed herein. In some examples, aspects of the operations of 1015 may be performed by a beam selection manager 730 as described with reference to FIG. 7.

At 1020, the method may include measuring channel characteristics for each beam of the first subset of beams at a first measurement interval, and measuring channel characteristics for each beam of the second subset of beams at a second measurement interval that has a longer periodicity than the first measurement interval. The operations of 1020 may be performed in accordance with examples as disclosed herein. In some examples, aspects of the operations of 1020 may be performed by a measurement manager 725 as described with reference to FIG. 7.

At 1025, the method may include triggering a beam switch to a first candidate beam of the second subset of beams based on the first candidate beam having measured channel characteristics that exceed corresponding channel characteristics of each beam of the first subset of beams. The operations of 1025 may be performed in accordance with examples as disclosed herein. In some examples, aspects of the operations of 1025 may be performed by a beam switch manager 735 as described with reference to FIG. 7.

Figure 11:
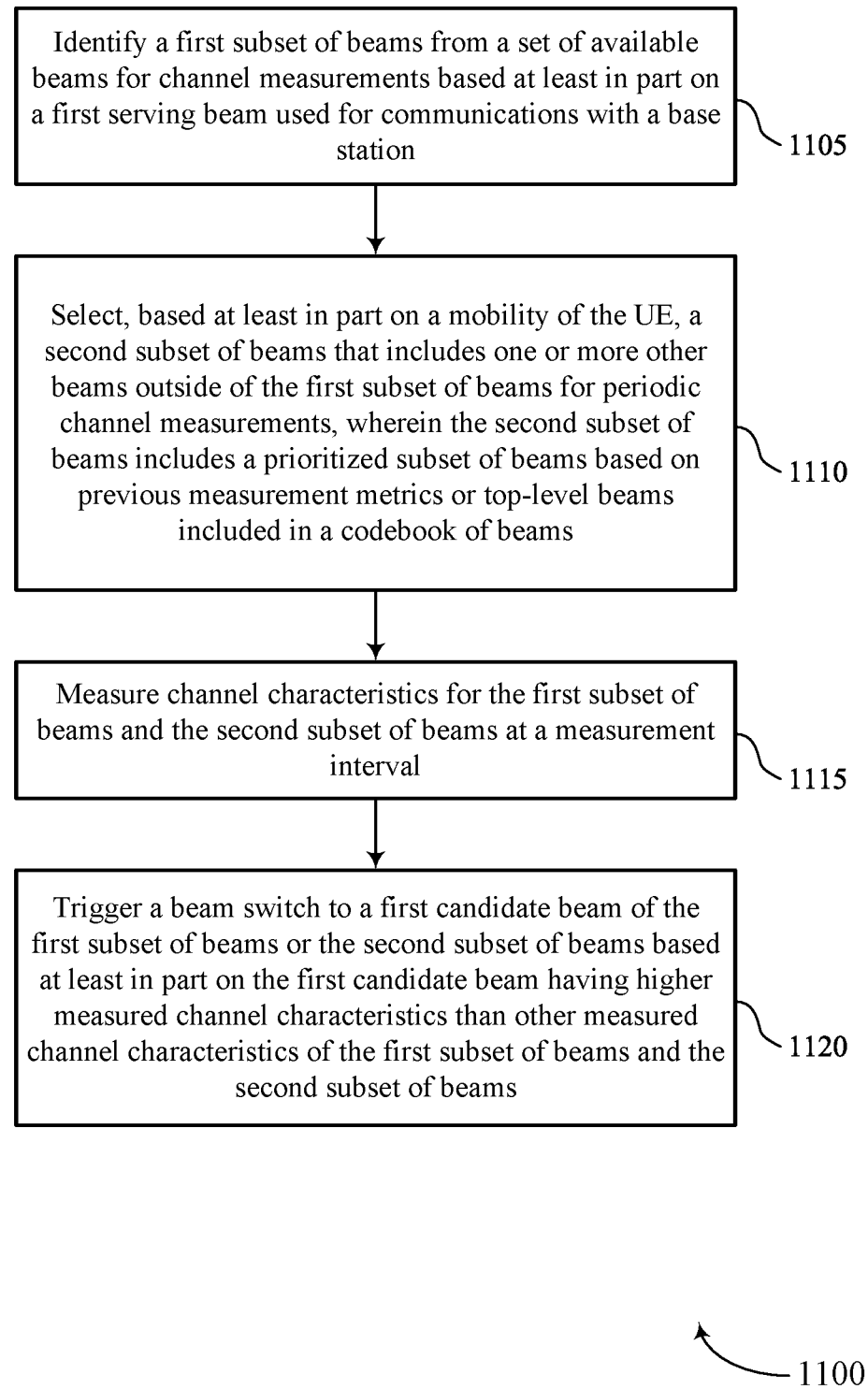

FIG. 11 shows a flowchart illustrating a method 1100 that supports techniques for beam selection based on measurement periodicities in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include identifying a first subset of beams from a set of available beams for channel measurements based on a first serving beam used for communications with an access network entity. The operations of 1105 may be performed in accordance with examples as disclosed herein. In some examples, aspects of the operations of 1105 may be performed by a beam selection manager 730 as described with reference to FIG. 7.

At 1110, the method may include selecting, based on a mobility of the UE, a second subset of beams that includes one or more other beams outside of the first subset of beams for periodic channel measurements, where the second subset of beams includes a prioritized subset of beams based on previous measurement metrics or top-level beams included in a codebook of beams. The operations of 1110 may be performed in accordance with examples as disclosed herein.

In some examples, aspects of the operations of 1110 may be performed by a beam selection manager 730 as described with reference to FIG. 7.

At 1115, the method may include measuring channel characteristics for the first subset of beams and the second subset of beams at a measurement interval. The operations of 1115 may be performed in accordance with examples as disclosed herein. In some examples, aspects of the operations of 1115 may be performed by a measurement manager 725 as described with reference to FIG. 7.

At 1120, the method may include triggering a beam switch to a first candidate beam of the first subset of beams or the second subset of beams based on the first candidate beam having higher measured channel characteristics than other measured channel characteristics of the first subset of beams and the second subset of beams. The operations of 1120 may be performed in accordance with examples as disclosed herein. In some examples, aspects of the operations of 1120 may be performed by a beam switch manager 735 as described with reference to FIG. 7.

The following provides an overview of aspects of the present disclosure:

Aspect 1: A method for wireless communication at a UE, comprising: measuring first channel characteristics of a serving beam according to a first periodicity associated with transmission of one or more reference signals using the serving beam; selecting one or more candidate beams from a set of available beams for measurement according to the first periodicity, the one or more candidate beams selected based at least in part on a signal strength of beams of the set of available beams; measuring second channel characteristics of each of the one or more candidate beams according to the first periodicity; and triggering a beam switch to a first candidate beam of the one or more candidate beams based at least in part on the first channel characteristics of the serving beam being below a threshold value.

Aspect 2: The method of aspect 1, wherein the measurement of the one or more candidate beams at the first periodicity provides consistent sampling and filtering of the one or more candidate beams and the serving beam for equivalent comparison of associated channel characteristics.

Aspect 3: The method of any of aspects 1 through 2, wherein the measuring the channel characteristics for the serving beam and for each of the one or more candidate beams comprises: measuring the channel characteristics of each beam on a per-SSB basis.

Aspect 4: The method of any of aspects 1 through 3, wherein the one or more candidate beams include up to a determined quantity of beams of the set of available beams that are within a measurement difference threshold of the serving beam.

Aspect 5: The method of aspect 4, further comprising: updating the selected one or more candidate beams after each measurement period of the first periodicity.

Aspect 6: The method of aspect 5, wherein each measurement period includes a set of measurement occasions and one or more beams other than the one or more candidate beams are measured in a measurement period when fewer candidate beams than measurement occasions are present.

Aspect 7: The method of any of aspects 1 through 6, wherein one or more beams of the set of available beams other than the one or more candidate beams are selected for inclusion in a prioritized subset of beams based on one or more previous measurement metrics, a codebook hierarchy, or any combinations thereof.

Aspect 8: The method of aspect 7, wherein the one or more previous measurement metrics identify the prioritized subset of beams as beams having one or more of a RSRP or SNR that exceed corresponding measurement metrics of other beams by a determined amount, and wherein the codebook hierarchy indicates one or more beams that are associated with the serving beam.

Aspect 9: The method of any of aspects 1 through 8, wherein the selecting of the one or more candidate beams is based at least in part on a detected mobility of the UE exceeding a threshold value.

Aspect 10: A method for wireless communication at a UE, comprising: selecting a first subset of beams from a set of available beams based at least in part on codebook hierarchy associated with a first beam that has one or more channel metrics that exceed corresponding channel metrics of other beams of the set of available beams, wherein the first subset of beams are prioritized for channel measurements; determining that a mobility of the UE is less than a threshold value; selecting, based at least in part on the determining, a second subset of beams from the set of available beams, the second subset of beams including highest level parent beams of the set of available beams; measuring channel characteristics for each beam of the first subset of beams at a first measurement interval, and measuring channel characteristics for each beam of the second subset of beams at a second measurement interval that has a longer periodicity than the first measurement interval; and triggering a beam switch to a first candidate beam of the second subset of beams based at least in part on the first candidate beam having measured channel characteristics that exceed corresponding channel characteristics of each beam of the first subset of beams.

Aspect 11: The method of aspect 10, wherein the codebook hierarchy indicates one or more parent beams, child beams, neighbor beams, or any combinations thereof, associated with the first beam.

Aspect 12: The method of any of aspects 10 through 11, wherein the first beam is selected based at least in part on being associated with a boresight of an antenna panel of the UE that has a LoS with an access network entity antenna, one or more measurement metrics, or any combinations thereof.

Aspect 13: The method of any of aspects 10 through 12, wherein the codebook hierarchy is a union of all adjacent beam relationships to the first beam in a codebook provided by an access network entity based at least in part on freespace beam characteristics.

Aspect 14: The method of any of aspects 10 through 13, wherein the second measurement interval corresponds to one beam of the second subset of beams per each first measurement interval.

Aspect 15: The method of aspect 14, wherein each beam of the second subset of beams is measured once per a quantity of second measurement intervals that corresponds to a quantity of beams in the second subset of beams.

Aspect 16: The method of any of aspects 10 through 15, wherein one or more beams of the first subset of beams are scheduled for measurement in measurement occasions that are unused for measurement of one or more beams of the second subset of beams.

Aspect 17: The method of aspect 16, wherein the second measurement interval is selected to provide for one or more measurements of each beam of the first subset of beams at a higher periodicity than measurements of each beam of the second subset of beams.

Aspect 18: The method of any of aspects 10 through 17, wherein the mobility of the UE is determined based at least in part on an IMU sensor measurement value, and wherein the threshold value is associated with a relatively slow or no UE movement as measured at the IMU.

Aspect 19: The method of any of aspects 10 through 18, wherein the measuring channel characteristics for the second subset of beams provides for the beam switch to be performed in an event of a hand blockage associated with the first subset of beams.

Aspect 20: A method for wireless communication at a UE, comprising: identifying a first subset of beams from a set of available beams for channel measurements based at least in part on a first serving beam used for communications with an access network entity; selecting, based at least in part on a mobility of the UE, a second subset of beams that includes one or more other beams outside of the first subset of beams for periodic channel measurements, wherein the second subset of beams includes a prioritized subset of beams based on previous measurement metrics or top-level beams included in a codebook of beams; measuring channel characteristics for the first subset of beams and the second subset of beams at a measurement interval; and triggering a beam switch to a first candidate beam of the first subset of beams or the second subset of beams based at least in part on the first candidate beam having higher measured channel characteristics than other measured channel characteristics of the first subset of beams and the second subset of beams.

Aspect 21: The method of aspect 20, wherein the second subset of beams includes one or more beams that are selected for inclusion in the prioritized subset of beams based on one or more previous measurement metrics.

Aspect 22: The method of aspect 21, wherein the one or more previous measurement metrics identify the prioritized subset of beams as beams having one or more of a RSRP or SNR that exceed corresponding measurement metrics of other beams by a determined amount.

Aspect 23: The method of any of aspects 20 through 22, wherein the first subset of beams includes one or more parent beams, child beams, neighbor beams, or any combinations thereof, associated with the first serving beam.

Aspect 24: The method of any of aspects 20 through 23, wherein the first serving beam is selected based at least in part on being associated with a boresight of an antenna panel of the UE that has a LoS with an access network entity antenna, one or more measurement metrics, or any combinations thereof.

Aspect 25: The method of any of aspects 20 through 24, wherein one or more beams of the first subset of beams are scheduled for measurement in measurement occasions that are unused for measurement of one or more beams of the second subset of beams.

Aspect 26: An apparatus for wireless communication at a UE, comprising a processor; memory coupled with the processor; and instructions stored in the memory and executable by the processor to cause the apparatus to perform a method of any of aspects 1 through 9.

Aspect 27: An apparatus for wireless communication at a UE, comprising at least one means for performing a method of any of aspects 1 through 9.

Aspect 28: A non-transitory computer-readable medium storing code for wireless communication at a UE, the code comprising instructions executable by a processor to perform a method of any of aspects 1 through 9.

Aspect 29: An apparatus for wireless communication at a UE, comprising a processor; memory coupled with the processor; and instructions stored in the memory and executable by the processor to cause the apparatus to perform a method of any of aspects 10 through 19.

Aspect 30: An apparatus for wireless communication at a UE, comprising at least one means for performing a method of any of aspects 10 through 19.

Aspect 31: A non-transitory computer-readable medium storing code for wireless communication at a UE, the code comprising instructions executable by a processor to perform a method of any of aspects 10 through 19.

Aspect 32: An apparatus for wireless communication at a UE, comprising a processor; memory coupled with the processor; and instructions stored in the memory and executable by the processor to cause the apparatus to perform a method of any of aspects 20 through 25.

Aspect 33: An apparatus for wireless communication at a UE, comprising at least one means for performing a method of any of aspects 20 through 25.

Aspect 34: A non-transitory computer-readable medium storing code for wireless communication at a UE, the code comprising instructions executable by a processor to perform a method of any of aspects 20 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    measuring first channel characteristics of a serving beam according to a first periodicity associated with transmission of one or more reference signals using the serving beam, wherein the first channel characteristics of the serving beam are measured on a per synchronization signal block (SSB) basis;
    selecting one or more candidate beams from a set of available beams for measurement according to the first periodicity, the one or more candidate beams selected based at least in part on a signal strength of beams of the set of available beams;
    measuring second channel characteristics of each of the one or more candidate beams according to the first periodicity, wherein the second channel characteristics of the each of the one or more candidate beams are measured on a per synchronization signal block (SSB) basis; and
    triggering a beam switch to a first candidate beam of the one or more candidate beams based at least in part on the first channel characteristics of the serving beam being below a threshold value.

2. The method of claim 1, wherein the measurement of the one or more candidate beams at the first periodicity provides consistent sampling and filtering of the one or more candidate beams and the serving beam for equivalent comparison of associated channel characteristics.

3. The method of claim 1, wherein the one or more candidate beams include up to a determined quantity of beams of the set of available beams that are within a measurement difference threshold of the serving beam.

4. The method of claim 3, further comprising:
    updating the selected one or more candidate beams after each measurement period of the first periodicity.

5. The method of claim 4, wherein each measurement period includes a set of measurement occasions and one or more beams other than the one or more candidate beams are measured in a measurement period when fewer candidate beams than measurement occasions are present.

6. The method of claim 1, wherein one or more beams of the set of available beams other than the one or more candidate beams are selected for inclusion in a prioritized subset of beams based on one or more previous measurement metrics, a codebook hierarchy, or any combinations thereof.

7. The method of claim 6, wherein the one or more previous measurement metrics identify the prioritized subset of beams as beams having one or more of a reference signal received power (RSRP) or signal to noise ratio (SNR) that exceed corresponding measurement metrics of other beams by a determined amount, and wherein the codebook hierarchy indicates one or more beams that are associated with the serving beam.

8. The method of claim 1, wherein the selecting of the one or more candidate beams is based at least in part on a detected mobility of the UE exceeding a threshold mobility value.

9. A method for wireless communication at a user equipment (UE), comprising:
    selecting a first subset of beams from a set of available beams based at least in part on codebook hierarchy associated with a first beam having one or more channel metrics that exceed corresponding channel metrics of other beams of the set of available beams, wherein the first subset of beams are prioritized for channel measurements;
    determining that a mobility of the UE is less than a threshold value;
    selecting, based at least in part on the determining, a second subset of beams from the set of available beams, the second subset of beams including highest level parent beams of the set of available beams, wherein one or more beams of the first subset of beams are scheduled for measurement in measurement occasions that are unused for measurement of one or more beams of the second subset of beams;
    measuring channel characteristics for each beam of the first subset of beams at a first measurement interval, and measuring channel characteristics for each beam of the second subset of beams at a second measurement interval having a longer periodicity than the first measurement interval; and
    triggering a beam switch to a first candidate beam of the second subset of beams based at least in part on the first candidate beam having measured channel characteristics that exceed corresponding channel characteristics of each beam of the first subset of beams.

10. The method of claim 9, wherein the codebook hierarchy indicates one or more parent beams, child beams, neighbor beams, or any combinations thereof, associated with the first beam.

11. The method of claim 9, wherein the first beam is selected based at least in part on being associated with a boresight of an antenna panel of the UE having a line-of-sight (LoS) with an access network entity antenna, one or more measurement metrics, or any combinations thereof.

12. The method of claim 9, wherein the codebook hierarchy is a union of all adjacent beam relationships to the first beam in a codebook provided by an access network entity based at least in part on freespace beam characteristics.

13. The method of claim 9, wherein the second measurement interval corresponds to one beam of the second subset of beams per each first measurement interval.

14. The method of claim 13, wherein each beam of the second subset of beams is measured once per a quantity of second measurement intervals that corresponds to a quantity of beams in the second subset of beams.

15. The method of claim 9, wherein the second measurement interval is selected to provide for one or more measurements of each beam of the first subset of beams at a higher periodicity than measurements of each beam of the second subset of beams.

16. The method of claim 9, wherein the mobility of the UE is determined based at least in part on an inertial measurement unit (IMU) sensor measurement value, and wherein the threshold value is associated with a relatively slow or no UE movement as measured at the IMU.

17. The method of claim 9, wherein the measuring channel characteristics for the second subset of beams provides for the beam switch to be performed in an event of a hand blockage associated with the first subset of beams.

18. A method for wireless communication at a user equipment (UE), comprising:
   identifying a first subset of beams from a set of available beams for channel measurements based at least in part on a first serving beam used for communications with an access network entity;
   selecting, based at least in part on a mobility of the UE, a second subset of beams that includes one or more other beams outside of the first subset of beams for periodic channel measurements, wherein the second subset of beams includes a prioritized subset of beams based on previous measurement metrics or top-level beams included in a codebook of beams, wherein the second subset of beams includes one or more beams that are selected for inclusion in the prioritized subset of beams based on one or more previous measurement metrics;
   measuring channel characteristics for the first subset of beams and the second subset of beams at a measurement interval; and
   triggering a beam switch to a first candidate beam of the first subset of beams or the second subset of beams based at least in part on the first candidate beam having higher measured channel characteristics than other measured channel characteristics of the first subset of beams and the second subset of beams.

19. The method of claim 18, wherein the one or more previous measurement metrics identify the prioritized subset of beams as beams having one or more of a reference signal received power (RSRP) or signal to noise ratio (SNR) that exceed corresponding measurement metrics of other beams by a determined amount.

20. The method of claim 18, wherein the first subset of beams includes one or more parent beams, child beams, neighbor beams, or any combinations thereof, associated with the first serving beam.

21. The method of claim 18, wherein the first serving beam is selected based at least in part on being associated with a boresight of an antenna panel of the UE having a line-of-sight (LoS) with an access network entity antenna, one or more measurement metrics, or any combinations thereof.

22. The method of claim 18, wherein one or more beams of the first subset of beams are scheduled for measurement in measurement occasions that are unused for measurement of one or more beams of the second subset of beams.

23. An apparatus for wireless communication at a user equipment (UE), comprising:
   a processor;
   memory coupled with the processor; and
   instructions stored in the memory and executable by the processor to cause the apparatus to:
      measure first channel characteristics of a serving beam according to a first periodicity associated with transmission of one or more reference signals using the serving beam, wherein the first channel characteristics of the serving beam are measured on a per synchronization signal block (SSB) basis;
      select one or more candidate beams from a set of available beams for measurement according to the first periodicity, the one or more candidate beams selected based at least in part on a signal strength of beams of the set of available beams;
      measure second channel characteristics of each of the one or more candidate beams according to the first periodicity, wherein the second channel characteristics of the each of the one or more candidate beams are measured on a per synchronization signal block (SSB) basis; and
      trigger a beam switch to a first candidate beam of the one or more candidate beams based at least in part on the first channel characteristics of the serving beam being below a threshold value.

24. The apparatus of claim 23, wherein the measurement of the one or more candidate beams at the first periodicity provides consistent sampling and filtering of the one or more candidate beams and the serving beam for equivalent comparison of associated channel characteristics.

25. The apparatus of claim 23, wherein the one or more candidate beams include up to a determined quantity of beams of the set of available beams that are within a measurement difference threshold of the serving beam.

26. The apparatus of claim 25, wherein the instructions are further executable by the processor to cause the apparatus to:
   update the selected one or more candidate beams after each measurement period of the first periodicity.

* * * * *